United States Patent
Lee et al.

(10) Patent No.: US 8,868,603 B2
(45) Date of Patent: *Oct. 21, 2014

(54) AMBIGUOUS STRUCTURED SEARCH QUERIES ON ONLINE SOCIAL NETWORKS

(71) Applicant: Facebook, Inc., Menlo Park, CA (US)

(72) Inventors: Yofay Kari Lee, Palo Alto, CA (US); Keith L. Peiris, San Francisco, CA (US); William R. Maschmeyer, San Francisco, CA (US); Lars Eilstrup Rasmussen, San Francisco, CA (US); Joshua Keith Duck, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 13/732,101

(22) Filed: Dec. 31, 2012

(65) Prior Publication Data

US 2013/0144899 A1    Jun. 6, 2013

Related U.S. Application Data

(63) Continuation-in-part of application No. 13/556,046, filed on Jul. 23, 2012, now Pat. No. 8,751,521, which is a continuation-in-part of application No. 12/763,162, filed on Apr. 19, 2010, now Pat. No. 8,572,129.

(51) Int. Cl.
   *G06F 17/30* (2006.01)
   *G06Q 50/00* (2012.01)
   *G06Q 10/10* (2012.01)

(52) U.S. Cl.
   CPC .......... *G06F 17/30392* (2013.01); *G06Q 50/01* (2013.01); *G06Q 10/101* (2013.01); *G06F 17/30528* (2013.01)
   USPC ........................................... 707/771; 707/798

(58) Field of Classification Search
   CPC .................... G06F 17/30861; G06Q 50/01
   USPC ......... 707/722, 727, 728, 732, 769, 784, 798, 707/802
   See application file for complete search history.

(56) References Cited

U.S. PATENT DOCUMENTS 6,539,232 B2    3/2003    Hendrey
6,957,184 B2    10/2005   Schmid (Continued)

FOREIGN PATENT DOCUMENTS

KR    2007-0049426    5/2007
KR    2009-0072575    7/2009
WO    2012/058690 A2    5/2012

OTHER PUBLICATIONS

Sankar, et al., "Under the Hood: Building out the infrastructure for Graph Search's infrastructure"; https://www.facebook.com/notes/facebook-engineering/under-the-hood-building-out-the-i . . . ; 8 pgs, Mar. 6, 2013.

(Continued)

*Primary Examiner* — Jorge A Casanova
(74) *Attorney, Agent, or Firm* — Baker Botts L.L.P.

(57) ABSTRACT

In one embodiment, a method includes accessing a social graph that includes a plurality of nodes and edges, receiving an unstructured text query comprising an ambiguous n-gram, identifying nodes and edges that correspond to the ambiguous n-gram, generating a first set of structured queries corresponding to the identified second nodes and edges, receiving from the first user a selection of a first structured query form the first set, and generating a second set of structured queries based on the selected first structured query.

20 Claims, 16 Drawing Sheets

(56) References Cited

U.S. PATENT DOCUMENTS

| | | | |
|---|---|---|---|
| 7,539,697 B1 | 5/2009 | Akella |
| 7,752,326 B2 | 7/2010 | Smit |
| 7,836,044 B2 | 11/2010 | Kamvar |
| 8,027,990 B1 | 9/2011 | Mysen et al. |
| 8,060,639 B2 | 11/2011 | Smit |
| 8,112,529 B2 | 2/2012 | Smit |
| 8,239,364 B2 | 8/2012 | Wable |
| 8,271,471 B1 | 9/2012 | Kamvar |
| 8,271,546 B2 | 9/2012 | Gibbs |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0255237 A1 | 12/2004 | Tong |
| 2005/0131872 A1 | 6/2005 | Calbucci et al. |
| 2005/0171955 A1 | 8/2005 | Hull |
| 2006/0136419 A1 | 6/2006 | Brydon |
| 2007/0174304 A1 | 7/2007 | Shrufi |
| 2007/0277100 A1 | 11/2007 | Sheha |
| 2008/0270615 A1 | 10/2008 | Centola |
| 2009/0006543 A1 | 1/2009 | Smit |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0281988 A1 | 11/2009 | Yoo |
| 2009/0287682 A1 | 11/2009 | Fujioka |
| 2009/0299963 A1 | 12/2009 | Pippori |
| 2010/0235354 A1 | 9/2010 | Gargaro |
| 2011/0078166 A1 | 3/2011 | Oliver |
| 2011/0087534 A1 | 4/2011 | Strebinger |
| 2011/0196855 A1 | 8/2011 | Wable |
| 2011/0289063 A1 | 11/2011 | Radlinski |
| 2012/0059708 A1 | 3/2012 | Galas |
| 2012/0136852 A1 | 5/2012 | Geller |
| 2012/0166432 A1 | 6/2012 | Tseng |
| 2012/0179637 A1 | 7/2012 | Juan |
| 2012/0185486 A1 | 7/2012 | Voigt |
| 2012/0278127 A1 | 11/2012 | Kirakosyan |
| 2012/0284329 A1 | 11/2012 | van den Oord |
| 2012/0290562 A1 | 11/2012 | Wable |
| 2012/0311034 A1 | 12/2012 | Goldband |
| 2013/0031106 A1 | 1/2013 | Schechter |
| 2013/0041876 A1 | 2/2013 | Dow |
| 2013/0066876 A1 | 3/2013 | Raskino |
| 2013/0086057 A1 | 4/2013 | Harrington |
| 2013/0124542 A1 | 5/2013 | Lee |
| 2013/0191372 A1 | 7/2013 | Lee |
| 2013/0191416 A1 | 7/2013 | Lee |
| 2013/0246404 A1 | 9/2013 | Annau et al. |

OTHER PUBLICATIONS

Sankar, et al., "Under the Hood: Indexing and ranking in Graph Search," https://www.facebook.com/notes/facebook-engineering/under-the-hood-indexing-and-rank . . . ; 11 pgs, Mar. 14, 2013.

Facebook Engineering, "Under the Hood: The natural language interface of Graph Search," https://www.facebook.com/notes/facebook-engineering/under-the-hood-the-natural-langua . . . ; 7 pgs, Apr. 29, 2013.

Xin, Xin et al., "A Social Recommendation Framework Based on Multi-scale Continuous Conditional Random Fields," *CIKM'09*, 2009.

Notice of Allowance for U.S. Appl. No. 12/763,171, Feb. 14, 2012.
Notice of Allowance for U.S. Appl. No. 12/763,132, Jan. 3, 2012.
Notice of Allowance for U.S. Appl. No. 12/763,145, Jan. 12, 2012.
Office Action for U.S. Appl. No. 12/763,162, Nov. 30, 2011.
U.S. Appl. No. 12/763,171, filed Apr. 19, 2010.
U.S. Appl. No. 12/763,162, filed Nov. 30, 2011.
U.S. Appl. No. 12/763,132, filed Nov. 30, 2011.
U.S. Appl. No. 12/763,145, filed Apr. 19, 2010.
U.S. Appl. No. 13/465,878, filed May 7, 2012.
U.S. Appl. No. 13/471,427, filed May 14, 2012.
U.S. Appl. No. 13/556,046, filed Jul. 23, 2012.
U.S. Appl. No. 13/556,060, filed Jul. 23, 2012.
U.S. Appl. No. 13/556,017, filed Jul. 23, 2012.
U.S. Appl. No. 13/556,072, filed Jul. 23, 2012.
IEEE Xplore Examiner's Search Results for U.S. Appl. No. 12/763,145, Jan. 12, 2012.
ACM Digital Library Examiner's Search Results for U.S. Appl. No. 12/763,145, Jan. 12, 2012.

Zhdanova et al., "A Social Networking Model of a Web Community", Centre for Communication Systems Research, 2007.

Extended European Search Report for Application 13197982.5-1952, Mar. 28, 2014.

Sebastian Marius Kirsch, et al., "*Beyond the Web: Retrieval in Social Information Spaces*," Advances in Information Retrieval Lecture Notes in Computer Science; Springer, Berlin, DE, pp. 84-95, Jan. 1, 2006.

Renaud Delbru, et al., "*Searching web data: An entity retrieval and high-performance indexing model*," Web Semantics: Science, Services and Agents on the World Wide Web, vol. 10, pp. 33-58. May 13, 2011.

U.S. Appl. No. 14/251,026, filed Apr. 11, 2014, Lee.
U.S. Appl. No. 14/251,069, filed Apr. 11, 2014, Lee.
U.S. Appl. No. 14/251,114, filed Apr. 11, 2014, Lee.
International Search Report and Written Opinion for International Application PCT/2013/076590, Mar. 28, 2014.

FIG. 6A

Mark

350

Mark

About
- Founder and CEO at Facebook
- Studied Computer Science at Harvard University
- Lives in Palo Alto, California
- From Dobbs Ferry, New York Photos
Map
Subscribers 16m
Likes 154
Subscribe  Message Do you know Mark? Subscribe to Mark to get his public posts in your news feed.

Work and Education

Facebook
Founder and CEO · Palo Alto, California · Feb 4, 2004 to present
Making the world more open and connected.

Harvard University
Sep 2002 to May 2004 · Computer Science · Psychology · Cambridge, Massachusetts Phillips Exeter Academy
Class of 2002 · Classics · Exeter, New Hampshire Albums
Mobile Uploads | Timeline Photos | Cover Photos | Random Press Photos
Mobile Photos | businessweek photos | Profile Pictures | Horizons

Q Current (Facebook) employees — 350

Mark
Founder and CEO at Facebook
- Your friend since November 2007
- Studied Computer Science at Harvard University
- Lives in Palo Alto, California
- 201 mutual friends including Kathy and Katie

[✓ Friends] [Message]

Blake
Director at Facebook
- Your friend since August 2007
- Studied at Stanford University
- Lives in Palo Alto, California
- 235 mutual friends including Sol and Craig

[✓ Friends] [Message]

Pedram
Engineer at Facebook
- Your friend since August 2007
- Studied MSc Computer Science at Stanford University
- Lives in Redwood City, California
- 231 mutual friends including Katie and Sol

[✓ Friends] [Message]

Kari
Software Engineer at Facebook
- Your friend

More Than 1000 People — View Grid

REFINE YOUR SEARCH — See All

Employer [Facebook ▼] Add
  [Position... ▼]
  [Employer Location... ▼]
  [Time Period... ▼]
School [Add...]
Current City [Add...]
Hometown [Add...]
Relationship Status [Add...]
Interested In [Add...]
Friendship [Add...]
Gender [Add...]
Name [Add...]

Suggested Searches
Q My friends of friends who like (Facebook)
Q My friends who live in (Palo Alto, California)
Q My friends who work at (Facebook)
Q My friends who work at (Acme)

AMBIGUOUS STRUCTURED SEARCH QUERIES ON ONLINE SOCIAL NETWORKS

RELATED APPLICATIONS

This application is a continuation-in-part under 35 U.S.C.§120 of U.S. patent application Ser. No. 13/556,046, filed 23 Jul. 2012, which is a continuation-in-part under 35 U.S.C.§120 of U.S. patent application Ser. No. 12/763,162, filed 19 Apr. 2010, each of which is incorporated by reference.

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, in response to a text query received from a user, a social-networking system may generate structured queries that include references to particular social-graph elements. By providing suggested structured queries in response to a user's text query, the social-networking system may provide a powerful way for users of an online social network to search for elements represented in a social graph based on their social-graph attributes and their relation to various social-graph elements.

In particular embodiments, the social-networking system may parse queries containing ambiguous terms with structured queries. The social-networking system may receive an unstructured text query from a user that contains an ambiguous n-gram. In response, the social-networking system may access a social graph and then parse the text query to identify social-graph elements that corresponded to ambiguous n-grams from the text query. A term in a query may be ambiguous when it possibly matches multiple social-graph elements. The social-networking system may generate a set of structured queries, where each structured query corresponds to one of the possible matching social-graph elements. The querying user may then select among the structured queries to indicate which social-graph element the querying user intended to reference with the ambiguous term. In response to the querying user's selection, the social-networking system may then effectively lock the ambiguous term to the social-graph element selected by the querying user, and then generate a new set of structured queries based on the selected social-graph element.

In particular embodiments, the social-networking system may generate a set of default structured queries for a page of the online social network. The social-networking system may identify a page that a user is currently viewing or otherwise accessing and then identifying any social-graph elements corresponding to that page. The social-graph elements corresponding to a page may be, for example, the node corresponding to a user- or concept-profile page, or the nodes/edges referenced in a structured query used to generate a particular search-results page. The social-networking system may then generate a set of default structured queries for the page based on the identified social-graph elements for that page. For example, when accessing a user-profile page for the user "Mark", some of the default structured queries for that page may include "Friends of Mark" or "Photos of Mark". These default structured queries may then be transmitted and presented to the user.

BRIEF DESCRIPTION OF THE DRAWINGS

FIGS. 6A-6F illustrate example webpages of an online social network.

DESCRIPTION OF EXAMPLE EMBODIMENTS

System Overview

Figure 1:
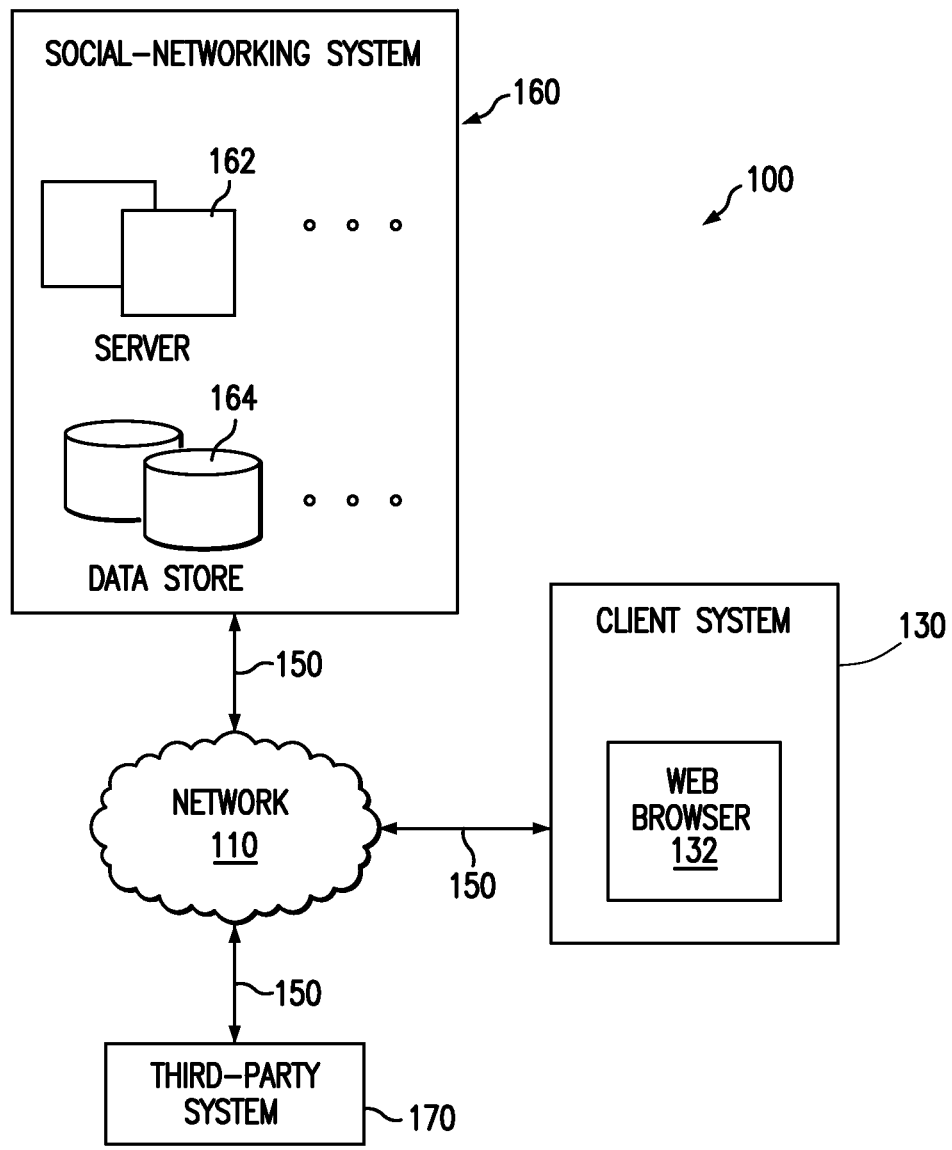
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

Social Graphs

Figure 2:
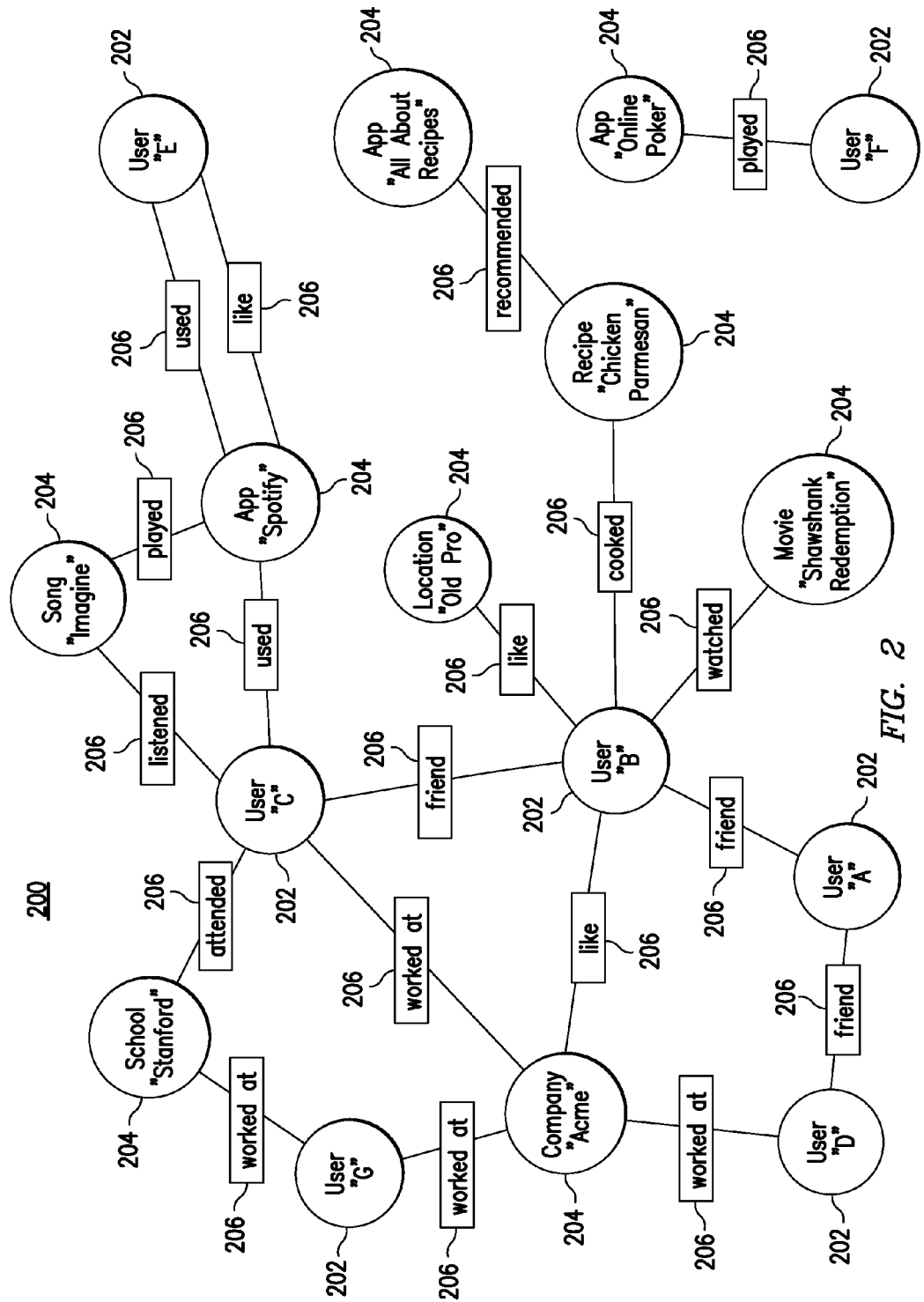
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user). In addition or as an alternative, an advertisement may be one or more sponsored stories (e.g. a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes by, for example, having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user. As an example and not by way of limitation, advertisements may be included among the search results of a search-results page, where sponsored content is promoted over non-sponsored content. As another example and not by way of limitation, advertisements may be included among suggested search query, where suggested queries that reference the advertiser or its content/products may be promoted over non-sponsored queries.

An advertisement may include social-networking-system functionality that a user may interact with. For example, an advertisement may enable a user to "like" or otherwise endorse the advertisement by selecting an icon or link associated with endorsement. As another example, an advertisement may enable a user to search (e.g., by executing a query) for content related to the advertiser. Similarly, a user may share the advertisement with another user (e.g. through social-networking system 160) or RSVP (e.g. through social-networking system 160) to an event associated with the advertisement. In addition or as an alternative, an advertisement may include social-networking-system context directed to the user. For example, an advertisement may display information about a friend of the user within social-networking system 160 who has taken an action associated with the subject matter of the advertisement.

Typeahead Processes

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested webpage (such as, for example, a user-profile page, a concept-profile page, a search-results webpage, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) the social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, the social-networking system 160 can also provides user's with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may transmit the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also transmit before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) the social-networking system 160.

In particular embodiments, the typeahead process may use one or more matching algorithms to attempt to identify matching social-graph elements. In particular embodiments, when a match or matches are found, the typeahead process may transmit a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr.

2010, and U.S. patent application Ser. No. 13/556,072, filed 23 Jul. 2012, which are incorporated by reference.

Structured Search Queries

Figure 3:
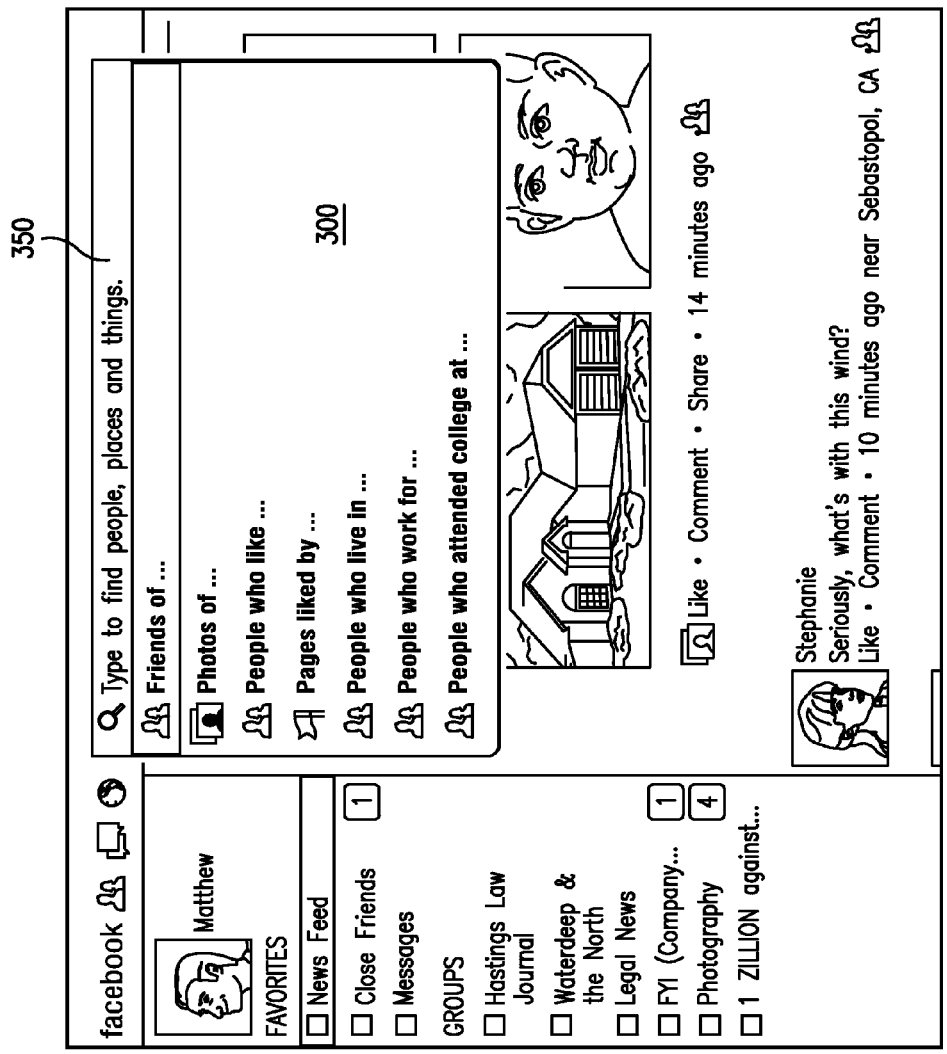
FIG. 3 illustrates an example webpage of an online social network.

FIG. 3 illustrates an example webpage of an online social network. In particular embodiments, a user may submit a query to the social-network system 160 by inputting text into query field 350. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into query field 350 to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or transmit a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results webpage with search results corresponding to the identified content and transmit the search-results webpage to the user. The search results may be presented to the user, often in the form of a list of links on the search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. The social-networking system 160 may then transmit the search-results webpage to the web browser 132 on the user's client system 130. The user may then click on the URL links or otherwise select the content from the search-results webpage to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

In particular embodiments, the typeahead processes described herein may be applied to search queries entered by a user. As an example and not by way of limitation, as a user enters text characters into a search field, a typeahead process may attempt to identify one or more user nodes 202, concept nodes 204, or edges 206 that match the string of characters entered search field as the user is entering the characters. As the typeahead process receives requests or calls including a string or n-gram from the text query, the typeahead process may perform or causes to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may transmit a response to the user's client system 130 that may include, for example, the names (name strings) of the matching nodes as well as, potentially, other metadata associated with the matching nodes. The typeahead process may then display a drop-down menu 300 that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 300. The user may then confirm the auto-populated declaration simply by keying "enter" on a keyboard or by clicking on the auto-populated declaration. Upon user confirmation of the matching nodes and edges, the typeahead process may transmit a request that informs the social-networking system 160 of the user's confirmation of a query containing the matching social-graph elements. In response to the request transmitted, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Element Detection and Parsing Ambiguous Terms

FIGS. 4A-4H illustrate example queries of the social network. In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. These structured queries may be presented to the querying user, who can then select among the structured queries to indicate which social-graph element the querying user intended to reference with the ambiguous term. In response to the querying user's selection, the social-networking system 160 may then lock the ambiguous term in the query to the social-graph element selected by the querying user, and then generate a new set of structured queries based on the selected social-graph element. FIGS. 4A-4H illustrate various example text queries in query field 350 and various structured queries generated in response in drop-down menus 300 (although other suitable graphical user interfaces are possible). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be transmitted to the first user and displayed in a drop-down menu 300 (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes and FIGS. 4A-4H illustrate generating particular structured queries in a particular manner, this disclosure contemplates generating any suitable structured queries in any suitable manner.

Figure 4A:
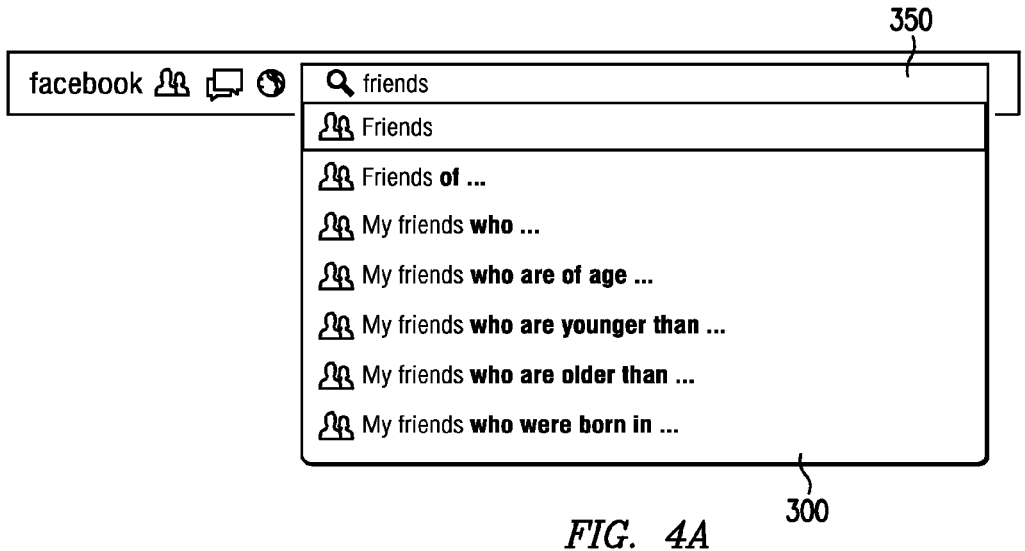
FIGS. 4A-4H illustrate example queries of the social network.
Figure 4B:
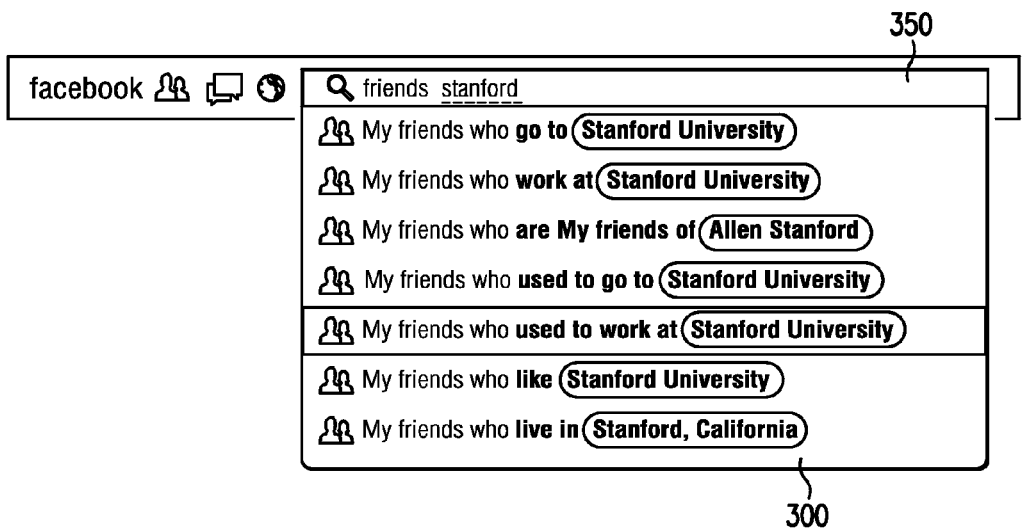
Figure 4C:
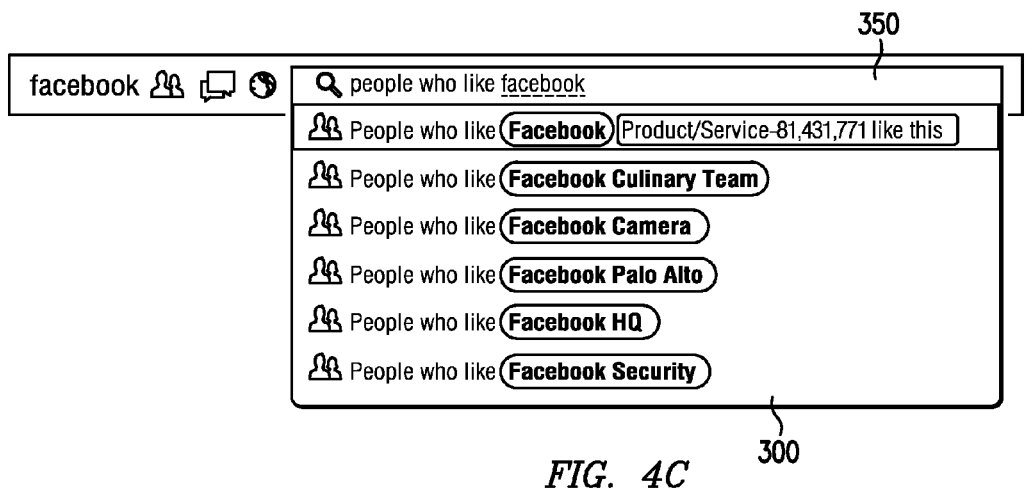

In particular embodiments, the social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into query field 350, as illustrated in FIGS. 4A-4B. As the querying user enters this text query into query field 350, the social-networking system 160 may provide various suggested structured queries, as illustrated in drop-down menus 300. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine (e.g., the text query "friends stanford" could be parsed to form the query command "intersect(school(Stanford University), friends(me)", which could be executed as a query in a social-graph database). Although this disclosure describes receiving particular queries in a particular manner, this disclosure contemplates receiving any suitable queries in any suitable manner.

In particular embodiments, social-networking system 160 may parse the unstructured text query (also simply referred to as a search query) received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the text query received from the querying user. In particular embodiments, each n-gram may comprise a character string (e.g., one or more characters of text) entered by the first user. As an example and not by way of limitation, the social-networking system 160 may parse the text query "friends stanford" to identify the following n-grams: friends; stanford; friends stanford. As another example and not by way of limitation, the social-networking system 160 may parse the text query "friends in palo alto" to identify the following n-grams: friends; in; palo; alto; friends in; in palo; palo alto; friend in palo; in palo also; friends in palo alto. In particular embodiments, each n-gram may comprise a contiguous sequence of n items from the text query. Although this disclosure describes parsing particular queries in a particular manner, this disclosure contemplates parsing any suitable queries in any suitable manner.

In particular embodiments, social-networking system 160 may identify a plurality of nodes or a plurality of edges corresponding to one or more of the n-grams of a text query. Identifying social-graph elements that correspond to an n-gram may be done in a variety of manners, such as, for example, by determining or calculating, for each n-gram identified in the text query, a score that the n-gram corresponds to a social-graph element. The score may be, for example, a confidence score, a probability, a quality, a ranking, another suitable type of score, or any combination thereof. As an example and not by way of limitation, the social-networking system 160 may determine a probability score (also referred to simply as a "probability") that the n-gram corresponds to a social-graph element, such as a user node 202, a concept node 204, or an edge 206 of social graph 200. The probability score may indicate the level of similarity or relevance between the n-gram and a particular social-graph element. There may be many different ways to calculate the probability. The present disclosure contemplates any suitable method to calculate a probability score for an n-gram identified in a search query. In particular embodiments, the social-networking system 160 may determine a probability, p, that an n-gram corresponds to a particular social-graph element. The probability, p, may be calculated as the probability of corresponding to a particular social-graph element, k, given a particular search query, X. In other words, the probability may be calculated as $p=(k|X)$. As an example and not by way of limitation, a probability that an n-gram corresponds to a social-graph element may calculated as an probability score denoted as $p_{i,j,k}$. The input may be a text query $X=(x_1, x_2, \ldots, x_N)$, and a set of classes. For each (i:j) and a class k, the social-networking system 160 may compute $p_{i,j,k}=p(\text{class}(x_{i:j})=k|X)$. As an example and not by way of limitation, the n-gram "stanford" could be scored with respect to the following social-graph elements as follows: school "Stanford University"=0.7; location "Stanford, Calif."=0.2; user "Allen Stanford"=0.1. In this example, because the n-gram "stanford" corresponds to multiple social-graph elements, it may be considered an ambiguous n-gram by the social-networking system 160. In other words, the n-gram is not immediately resolvable to a single social-graph element based on the parsing algorithm used by the social-networking system 160. In particular embodiments, after identifying an ambiguous n-gram, the social-networking system 160 may highlight that n-gram in the text query to indicate that it may correspond to multiple social-graph elements. As an example and not by way of limitation, as illustrated in FIG. 4B the term "Stanford" in query field 350 has been highlighted with a dashed-underline to indicate that it may correspond to multiple social-graph elements, as discussed previously. As another example and not by way of limitation, as illustrated in FIGS. 4C and 4E-4H the term "facebook" has been highlighted with a dashed-underline to indicate that it may correspond to multiple social-graph elements. Although this disclosure describes determining whether n-grams correspond to social-graph elements in a particular manner, this disclosure contemplates determining whether n-grams correspond to social-graph elements in any suitable manner. Moreover, although this disclosure describes determining whether an n-gram corresponds to a social-graph element using a particular type of score, this disclosure contemplates determining whether an n-gram corresponds to a social-graph element using any suitable type of score.

In particular embodiments, the social-networking system 160 may determine the probability that a particular n-gram corresponds to a social-graph element based social-graph information. As an example and not by way of limitation, when determining a probability, p, that an n-gram corresponds to a particular social-graph element, the calculation of the probability may also factor in social-graph information. Thus, the probability of corresponding to a particular social-graph element, k, given a particular search query, X, and social-graph information, G, may be calculated as $p=(k|X,G)$. In particular embodiments, the probability that an n-gram corresponds to a particular node may be based on the degree of separation between the first user node 202 and the particular node. A particular n-gram may have a higher probability of corresponding to a social-graph element that is closer in the social graph 200 to the querying user (i.e., fewer degrees of separation between the element and the first user node 202) than a social-graph element that is further from the user (i.e., more degrees of separation). As an example and not by way of limitation, referencing FIG. 3, if user "B" inputs a text query of "chicken," the calculated probability that this corresponds to the concept node 204 for the recipe "Chicken Parmesan," which is connected to user "B" by an edge 206, may be higher than the calculated probability that this n-gram corresponds to other nodes associated with the n-gram chicken (e.g., concept nodes 204 corresponding to "chicken nuggets," or "funky chicken dance") that are not connected to user "B" in the social graph 200. In particular embodiments, the probability that an n-gram corresponds to a particular node may be based on the search history associated with the querying user. Social-graph elements that the querying user has previously accessed, or are relevant to the social-graph elements that the querying user has previously accessed, may be more likely to be the target of the querying user's search query. As an example and not by way of limitation, if first user has previously visited a the "Facebook Culinary Team" profile page, but has never visited the "Facebook Studio" profile page, when determining the probability that the n-gram "facebook" corresponds to either of the concept nodes 204 corresponding to these pages, the social-networking system 160 may determine that the concept node 204 for "Facebook Culinary Team" has a relatively higher probability of corresponding to the n-gram "facebook" because the querying user has previously accessed that concept node 204 (and may in fact already be connected to that node with a "viewed" edge 206). Although this disclosure describes determining whether n-grams correspond to social-graph elements in a particular manner, this disclosure contemplates determining whether n-grams correspond to social-graph elements in any suitable manner.

In particular embodiments, social-networking system 160 may identify one or more edges 206 having a probability greater than an edge-threshold probability. Each of the identified edges 206 may correspond to at least one of the n-grams. As an example and not by way of limitation, the n-gram may only be identified as corresponding to an edge, k, if $p_{i,j,k} > p_{edge-threshold}$. In particular embodiments, the social-networking system 160 may identify a plurality of edges 206 (or edge types) as corresponding to a particular n-gram. In such a case, the n-gram may be considered an ambiguous n-gram by the social-networking system 160 because multiple edges have a probability, $p_{i,j,k}$ that is greater than $p_{edge-threshold}$. As an example and not by way of limitation, the n-gram "work" could be scored with respect to the following social-graph elements as follows: edge-type "work at"=0.6; edge-type "worked at"=0.39; edge-type "lives in"=0.01. If the edge-threshold probability is equal to 0.25, then the edge-types corresponding to "work at" and "worked at" may be identified because they have probabilities greater than the edge-threshold probability, while the edge-type corresponding to "lives in" would not be identified because its probability is not greater than the edge-threshold probability. Consequently, because the social-networking system 160 identified multiple edge-types as corresponding to the n-gram "work", that n-gram may be considered ambiguous. In particular embodiments, each of the identified edges 206 may be connected to at least one of the identified nodes. In other words, the social-networking system 160 may only identify edges 206 or edge-types that are connected to user nodes 202 or concept nodes 204 that have previously been identified as corresponding to a particular n-gram. Although this disclosure describes identifying edges 206 that correspond to n-grams in a particular manner, this disclosure contemplates identifying edges 206 that correspond to n-grams in any suitable manner.

In particular embodiments, social-networking system 160 may identify one or more user nodes 202 or concept nodes 204 having a probability greater than a node-threshold probability. Each of the identified nodes may correspond to at least one of the n-grams. As an example and not by way of limitation, the n-gram may only be identified as corresponding to a node, k, if $p_{i,j,k} > p_{node-threshold}$. In particular embodiments, the social-networking system 160 may identify a plurality of edges 206 (or edge types) as corresponding to a particular n-gram. In such a case, the n-gram may be considered an ambiguous n-gram by the social-networking system 160 because multiple edges have a probability, $p_{i,j,k}$ that is greater than $p_{edge-threshold}$. As an example and not by way of limitation, the n-gram "facebook" could be scored with respect to the following social-graph elements as follows: company "Facebook"=0.8; group "Facebook Culinary Team"=0.15; website "Facebook Studio"=0.05. If the node-threshold probability is equal to 0.1, then the concept nodes 204 corresponding to "Facebook" and "Facebook Culinary Team" may be identified because they have probabilities greater than the node-threshold probability, while the concept node 204 corresponding to "Facebook Studio" would not be identified because its probability is not greater than the node-threshold probability. Consequently, because the social-networking system 160 identified multiple concept nodes 204 as corresponding to the n-gram "facebook", that n-gram may be considered ambiguous. In particular embodiments, each of the identified user nodes 202 or concept nodes 204 may be connected to at least one of the identified edges 206. In other words, the social-networking system 160 may only identify nodes or nodes-types that are connected to edges 206 that have previously been identified as corresponding to a particular n-gram. In particular embodiments, the social-networking system 160 may only identify nodes that are within a threshold degree of separation of the user node 202 corresponding to the first user (i.e., the querying user). The threshold degree of separation may be, for example, one, two, three, or all. Although this disclosure describes identifying nodes that correspond to n-grams in a particular manner, this disclosure contemplates identifying nodes that correspond to n-grams in any suitable manner.

Generating Structured Search Queries

In particular embodiments, the social-networking system 160 may access a context-free grammar model comprising a plurality of grammars. Each grammar of the grammar model may comprise one or more non-terminal tokens (or "non-terminal symbols") and one or more terminal tokens (or "terminal symbols"/"query tokens"), where particular non-terminal tokens may be replaced by terminal tokens. A grammar model is a set of formation rules for strings in a formal language. Although this disclosure describes accessing particular grammars, this disclosure contemplates any suitable grammars.

In particular embodiments, the social-networking system 160 may generate one or more strings using one or more grammars. To generate a string in the language, one begins with a string consisting of only a single start symbol. The production rules are then applied in any order, until a string that contains neither the start symbol nor designated non-terminal symbols is produced. In a context-free grammar, the production of each non-terminal symbol of the grammar is independent of what is produced by other non-terminal symbols of the grammar. The non-terminal symbols may be replaced with terminal symbols (i.e., terminal tokens or query tokens). Some of the query tokens may correspond to identified nodes or identified edges, as described previously. A string generated by the grammar may then be used as the basis for a structured query containing references to the identified nodes or identified edges. The string generated by the grammar may be rendered in a natural-language syntax, such that a structured query based on the string is also rendered in natural language. A context-free grammar is a grammar in which the left-hand side of each production rule consists of only a single non-terminal symbol. A probabilistic context-free grammar is a tuple $\langle \Sigma, N, S, P \rangle$, where the disjoint sets $\Sigma$ and $N$ specify the terminal and non-terminal symbols, respectively, with S∈N being the start symbol. P is the set of productions, which take the form E→ξ(p), with E∈N, ξ∈(Σ∪N)⁺, and p=Pr(E→ξ), the probability that E will be expanded into the string ξ. The sum of probabilities p over all expansions of a given non-terminal E must be one. Although this disclosure describes generating strings in a particular manner, this disclosure contemplates generating strings in any suitable manner.

Figure 4D:
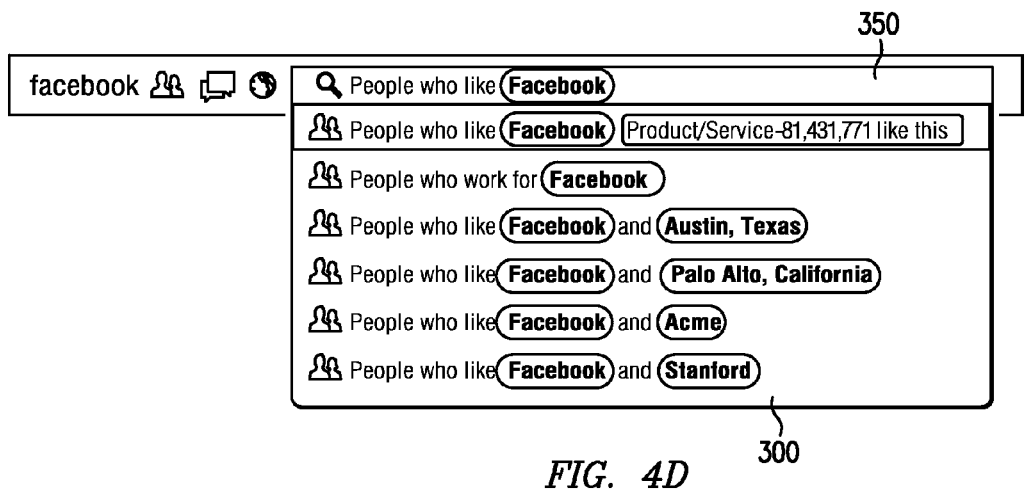
Figure 4E:
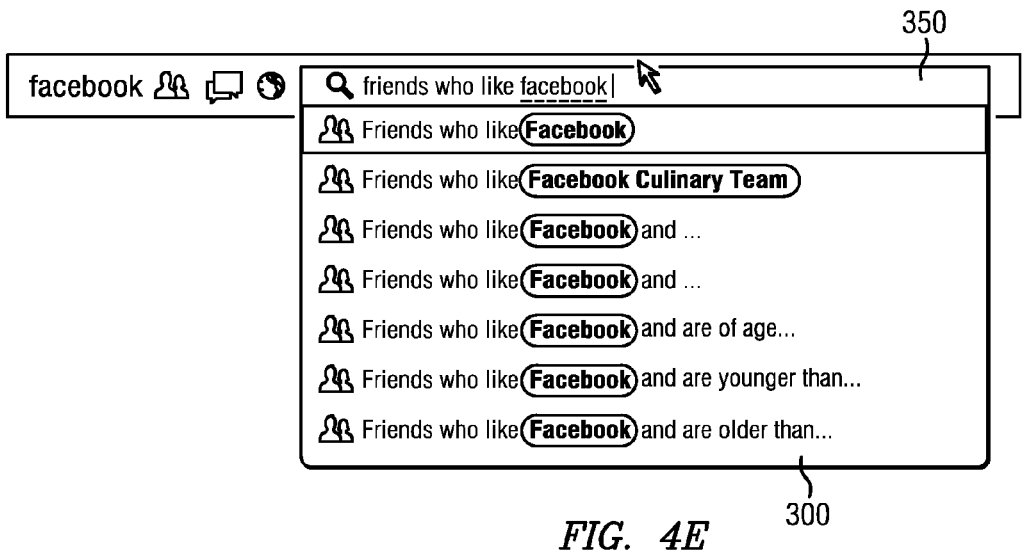
Figure 4F:
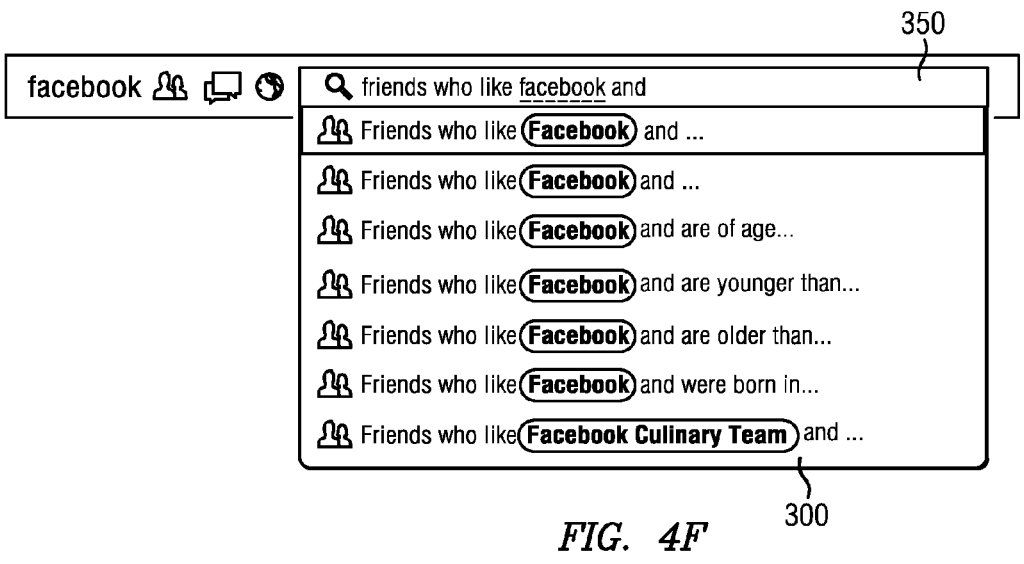
Figure 4G:
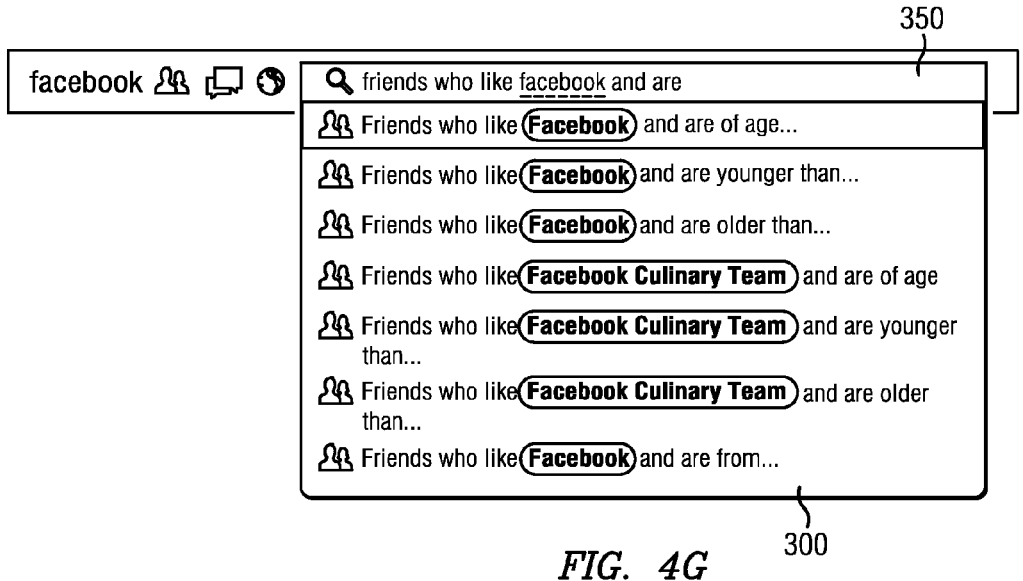
Figure 4H:
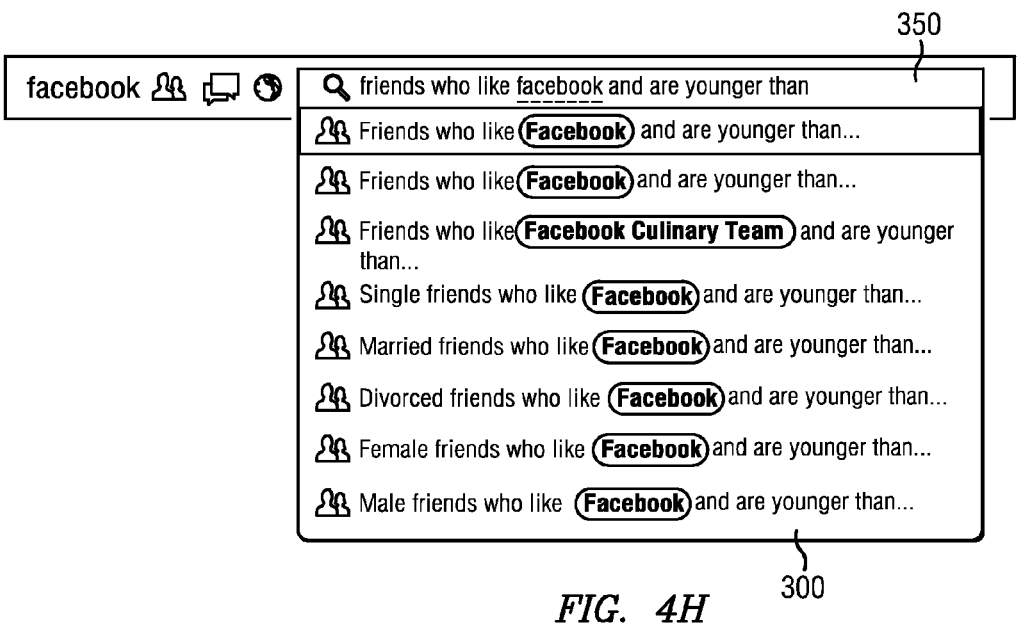

In particular embodiments, the social-networking system 160 may generate one or more structured queries. The structured queries may be based on the natural-language strings generated by one or more grammars, as described previously. Each structured query may include references to one or more of the identified nodes or one or more of the identified edges 206. This type of structured query may allow the social-networking system 160 to more efficiently search for resources and content related to the online social network (such as, for example, profile pages) by searching for content connected to or otherwise related to the identified user nodes 202 and the identified edges 206. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, as illustrated in FIG. 4E, in response to the text query, "friends who like facebook," the social-networking system 160 may generate a structured query "Friends who like Facebook," where "Friends," "like," and "Facebook" in the structured query are references corresponding to particular social-graph elements as described previously (i.e., a friend-type edge 206, a like-type edge 206, and concept node 204 corresponding to the company "Facebook"). Although this disclosure describes generating particular structured queries in a particular manner, this disclosure contemplates generating any suitable structured queries in any suitable manner.

In particular embodiments, social-networking system 160 may rank the generated structured queries. The structured queries may be ranked based on a variety of factors. Where the text query received from the querying user contains an ambiguous n-gram, the suggested structured queries generated in response to that text query may be ranked, for example, in order of the probability or likelihood that the identified nodes/edges referenced in those structured queries match the intent of the querying user, as determined by the social-networking system 160. After ranking the structured queries, the social-networking system 160 may then transmit only those structured queries having a rank greater than a threshold rank (e.g., the top seven ranked queries may be transmitted to the querying user and displayed in a drop-down menu 300). In particular embodiments, the rank for a structured query may be based on the degree of separation between the user node 202 of the querying user and the particular social-graph elements referenced in the structured query. Structured queries that reference social-graph elements that are closer in the social graph 200 to the querying user (i.e., fewer degrees of separation between the element and the querying user's user node 202) may be ranked more highly than structured queries that reference social-graph elements that are further from the user (i.e., more degrees of separation). In particular embodiments, the social-networking system 160 may rank the structured queries based on a search history associated with the querying user. Structured queries that reference social-graph elements that the querying user has previously accessed, or are relevant to the social-graph elements the querying user has previously accessed, may be more likely to be the target of the querying user's search query. Thus, these structured queries may be ranked more highly. As an example and not by way of limitation, if querying user has previously visited the "Stanford University" profile page but has never visited the "Stanford, Calif." profile page, when determining the rank for structured queries referencing these concepts, the social-networking system 160 may determine that the structured query referencing the concept node 204 for "Stanford University" has a relatively high rank because the querying user has previously accessed the concept node 204 for the school. In particular embodiments, the social-networking system 160 may rank the structured queries based on advertising sponsorship. An advertiser (such as, for example, the user or administrator of a particular profile page corresponding to a particular node) may sponsor a particular node such that a structured query referencing that node may be ranked more highly. Although this disclosure describes ranking structured queries in a particular manner, this disclosure contemplates ranking structured queries in any suitable manner.

More information on generating structured queries and grammar models may be found in U.S. patent application Ser. No. 13/674,695, filed 12 Nov. 2012, and U.S. patent application Ser. No. 13/731,866, filed 31 Dec. 2012, each of which is incorporated by reference.

Disambiguating Terms with Structured Queries

In particular embodiments, in response to receiving a text query comprising an ambiguous n-gram, the social-networking system 160 may generate a set of structured queries, where each structured query in this set corresponds to an identified node or identified edge corresponding to the ambiguous n-gram. Thus, each of these structured queries may comprise a reference to the corresponding identified node or identified edge. For each identified node or identified edge corresponding to the ambiguous n-gram, the social-networking system 160 may generate at least one structured query referencing the identified node or identified edge. As discussed previously, these structured queries may be presented to the querying user, who can then select among the structured queries to indicate which social-graph element the querying user intended to reference with the ambiguous term. In response to the querying user's selection, the social-networking system 160 may then lock the ambiguous term in the query to the social-graph element selected by the querying user, and then generate a new set of structured queries based on the selected social-graph element. As an example and not by way of limitation, referencing FIGS. 4C and 4D, in response to receiving the unstructured text query "people who like facebook" in query field 350, the social-networking system 160 may generate a set of structured queries, where each structured query references a social-graph entity corresponding to one of the identified concept nodes 204 that correspond to the ambiguous n-gram "facebook". In this example, the set of structured queries includes references to "Facebook", "Facebook Culinary Team", and "Facebook Camera", among others, each of which may have been identified by the social-networking system 160 as possibly corresponding to the ambiguous n-gram "facebook" from the received text query. The querying user may then select one of the structured queries to select the particular concept referenced in the structured query and thereby lock the structured query to the concept node 204 corresponding to the selected concept. For example, if the querying user selected the first suggested structured query from the drop-down menu 300 illustrated in FIG. 4C, "People who like Facebook", then the social-networking system 160 may generate a new set of structured queries based on this selection, as illustrated in FIG. 4D, where the new set of structured queries in the drop-down menu 300 of FIG. 4D all reference the concept node 204 for "Facebook" since that has now been locked to the previously ambiguous n-gram "facebook" from the received text query. Although this disclosure describes generating particular structured queries in response to particular ambiguous text queries, this disclosure contemplates generating any suitable structured queries in response to any suitable ambiguous text queries.

In particular embodiments, a structured query may include a snippet of contextual information about one or more of the social-graph elements referenced in the structured query. Where the structured query is generated in response to a text query containing an ambiguous n-gram, the snippet may provide contextual information about the identified node or identified edge corresponding to the ambiguous n-gram that is referenced in a particular structured query. The snippet included with the structured query may be presented to the querying user (e.g., inline with the structured query in drop-down menu 300) to help aid the user determine whether the referenced social-graph element matches with the user's intent. In particular embodiments, snippets may be included automatically with a structured query. When displaying a set of structured queries, a snippet of contextual information may be automatically included with each structured query. In particular embodiments, a snippet may be included with a structured query when the querying user interacts with the structured query. When the structured queries are initially presented to the querying user, a snippet may not be necessarily included with each structured query. Instead, the snippet for a particular structured query may be presented to the querying user after the user interacts with the structured query, such as, for example, by mousing over, focusing on, or otherwise interacting with the structured query. As an example and not by way of limitation, referencing FIGS. 4C, in response to the text query "people who like facebook" in query field 350 (which contains the ambiguous term "facebook"), the social-networking system 160 has generated structured queries referencing the concept nodes 204 corresponding to the company "Facebook", the group "Facebook Culinary Team", among others, which are presented to the user in drop-down menu 300. In the example illustrated in FIG. 4C, the querying user has focused on the structured query "People who like Facebook", and in response a snippet reading "Product/Service-81,431,771 like this" has been generated next to the structured query, where this snippet provides contextual information about the referenced concept node 204 for the company "Facebook", indicating that it corresponds to a "Product/Service". Furthermore, this snippet provides contextual information about the referenced like-type edge 206, indicating that "81,431,771 like this" (i.e., that number of user nodes 202 are connected to the concept node 204 for "Facebook" by a like-type edge 206). Similarly, were the user to focus on other structured queries displayed in drop-down menu 300 of FIG. 4C, different snippets may be displayed for each of those structured queries based on the social-graph elements referenced in the particular structured query. Although this disclosure illustrates and describes generating particular snippets for structured queries in a particular manner, this disclosure contemplates generating any suitable snippets for structured queries in any suitable manner.

In particular embodiments, social-networking system 160 may transmit one or more of the structured queries to the querying user. As an example and not by way of limitation, after the structured queries are generated, the social-networking system 160 may transmit one or more of the structured queries as a response (which may utilize AJAX or other suitable techniques) to the user's client system 130 that may include, for example, the names (name strings) of the referenced social-graph elements, other query limitations (e.g., Boolean operators, etc.), as well as, potentially, other metadata associated with the referenced social-graph elements. The web browser 132 on the querying user's client system 130 may display the transmitted structured queries in a drop-down menu 300, as illustrated in FIGS. 4A-4H. Where the structured queries are generated in response to receiving a text query with an ambiguous n-gram, then the transmitted structured queries may be selectable by the querying user to indicate that the identified node or identified edges reference in the structured query match an intent of the user for the ambiguous n-gram. As an example and not by way of limitation, referencing FIG. 4C, in response to the unstructured text query "people who like facebook" in query field 350, the social-networking system 160 may generate the set of structured queries illustrated in drop-down menu 300. These structured queries include references to the concept nodes 204 corresponding to "Facebook", "Facebook Culinary Team", and "Facebook Camera", among others, each of which may have been identified by the social-networking system 160 as possibly corresponding to the ambiguous n-gram "facebook" from the received text query. The querying user may then select one of these structured queries to select the particular concept referenced in the structured query and thereby lock the ambiguous n-gram "facebook" to the concept node 204 corresponding to the selected structured query. In particular embodiments, the transmitted queries may be presented to the querying user in a ranked order, such as, for example, based on a rank previously determined as described above. Structured queries with better rankings may be presented in a more prominent position. Furthermore, in particular embodiments, only structured queries above a threshold rank may be transmitted or displayed to the querying user. As an example and not by way of limitation, as illustrated in FIGS. 4A-4B, the structured queries may be presented to the querying user in a drop-down menu 300 where higher ranked structured queries may be presented at the top of the menu, with lower ranked structured queries presented in descending order down the menu. In the examples illustrated in FIGS. 4A-4H, only the seven highest ranked queries are transmitted and displayed to the user. In particular embodiments, one or more references in a structured query may be highlighted (e.g., outlined, underlined, circled, bolded, italicized, colored, lighted, offset, in caps) in order to indicate its correspondence to a particular social-graph element. As an example and not by way of limitation, as illustrated in FIG. 4B, the references to "Stanford University" and "Stanford, Calif." are highlighted (outlined) in the structured queries to indicate that it corresponds to a particular concept node 204. Similarly, the references to "Friends", "like", "work at", and "go to" in the structured queries presented in drop-down menu 300 could also be highlighted to indicate that they correspond to particular edges 206. Although this disclosure describes transmitting particular structured queries in a particular manner, this disclosure contemplates transmitting any suitable structured queries in any suitable manner.

In particular embodiments, social-networking system 160 may receive from the querying user a selection of one of the structured queries. The nodes and edges referenced in the received structured query may be referred to as the selected nodes and selected edges, respectively. By selecting one of the structured queries generated in response to a text query with an ambiguous n-gram, the querying user may be indicating that the node or edges referenced in the selected structured query match the intent of the user for the ambiguous n-gram. As an example and not by way of limitation, the web browser 132 on the querying user's client system 130 may display the transmitted structured queries in a drop-down menu 300, as illustrated in FIGS. 4A-4B, which the user may then click on or otherwise select (e.g., by simply keying "enter" on his keyboard) to indicate the particular structured query the user wants the social-networking system 160 to execute. By selecting one of the structured queries, the querying user may thereby lock the ambiguous n-gram to the social-graph element corresponding to the selected structured query. As an example and not by way of limitation, referencing FIG. 4C, the querying user may be inputted the unstructured text query "friends who like facebook" into query field 350, where the term "facebook" in the text query has been identified as an ambiguous n-gram. If the querying user selects the second suggested structured query from the drop-down menu 300 illustrated in FIG. 4C, "People who like Facebook Culinary Team", which corresponds to the concept node 204 for the group "Facebook Culinary Team", then the social-networking system 160 may lock the ambiguous n-gram "facebook" from the text query to the concept node 204 for "Facebook Culinary Team" and generate a new set of structured queries based on this selection (i.e., a new set of structured queries that reference the concept node 204 for "Facebook Culinary Team"). Furthermore, upon selecting the particular structured query, the user's client system 130 may call or otherwise instruct to the social-networking system 160 to execute the selected structured query. Although this disclosure describes receiving selections of particular structured queries in a particular manner, this disclosure contemplates receiving selections of any suitable structured queries in any suitable manner.

In particular embodiments, in response to receiving a selection of a structured query from the querying user, the social-networking system 160 may generate a new set of structured queries based on the selection. The selected structured query may comprise a reference to one of the identified nodes or identified edges corresponding to the ambiguous n-gram. These identified nodes or identified edges may be referred to at the selected nodes or selected edges, indicating that the particular social-graph element referenced in the structured query selected by the querying user represents a social-graph element that the querying user specifically intended to select. The structured queries of this new set may comprise reference to the selected node or selected edge, and may further comprise reference to zero or more additional nodes and zero or more additional edges. In this way, the suggested structured queries generated by the social-networking system 160 may expanded off of the user's selection, where the querying user effectively selects the base of the query to use for generating more complex queries. As an example and not by way of limitation, the drop-down menu 300 illustrated in FIG. 4D shows a set of structured queries generated in response to the querying user's selection of the suggested structured query "People who like Facebook" from FIG. 4C. The suggested structured query "People who like Facebook" corresponded to the concept node 204 for the company "Facebook", which had been identified as a concept node 204 that corresponded to the ambiguous n-gram "facebook" from the unstructured text query in query field 350 of FIG. 4C. After selecting this structured query, the ambiguous n-gram "facebook" was locked to the concept node 204 for the company "Facebook" and the social-networking system 160 then generated a new set of structured queries that referenced this concept node 204, along with additional social-graph elements. The selected structured query may also be used to replace the unstructured text query previously received in the query field 350. For example, once the querying user selected the structured query "People who like Facebook" from the drop-down menu 300 in FIG. 4C, that selected structured query may replace the original text query, and the social-networking system 160 may auto-populate the query field 350 with the selected structured query, as illustrated in FIG. 4D, where the query field 350 is now populated with the previously selected structured query. In particular embodiments, the querying user may then continue to input text into query field 350 to further modify the query, for example, by adding a text string before, into, or after the structured query that has been populated into the query field 350. In this way, the structured query may be further refined by the querying user. Furthermore, the processes described above may be repeated in response to the input of additional ambiguous n-grams. Thus, the social-networking system 160 may parse the unstructured text query portion of a query that has been inputted into query field 350. Although this disclosure describes generating structured queries in response to a user's selection in a particular manner, this disclosure contemplates generating structured queries in response to a user's selection in any suitable manner.

Figure 5:
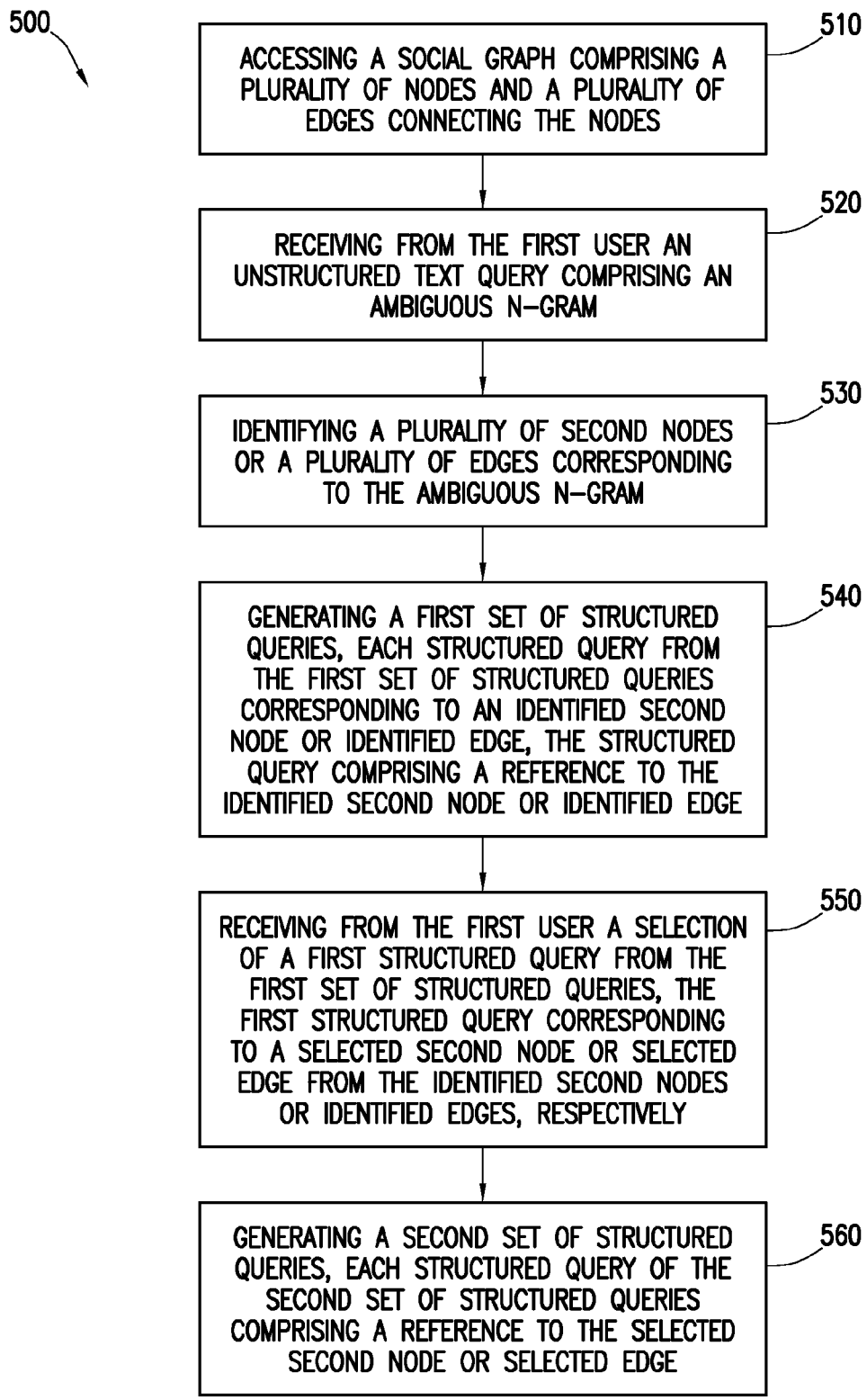
FIG. 5 illustrates an example method for disambiguating terms in text queries to generate structured search queries.

FIG. 5 illustrates an example method 500 for disambiguating terms in text queries to generate structured search queries. The method may begin at step 510, where the social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 520, the social-networking system 160 may receive from the first user an unstructured text query that comprises an ambiguous n-gram. At step 530, the social-networking system 160 may a plurality of second nodes or a plurality of edges corresponding to the ambiguous n-gram. For example, the social-networking system 160 may identify two different nodes that match the ambiguous n-gram from the text query. At step 540, the social-networking system 160 may generate a first set of structured queries. Each of these structured queries may correspond to an identified second node or identified edge, and each structure query may include a reference to that identified second node or identified edge. For example, the social-networking system 160 may generate one structured query with a reference to a particular node and another structured query with a reference to another node, where both nodes possibly match the ambiguous n-gram. At step 550, the social-networking system 160 may receive from the first user a selection of a first structured query from the first set of structured queries. The first structured query may correspond to a selected second node or selected edge from the identified second nodes or identified edges, respectively. In this way, the first user may disambiguate the ambiguous n-gram by indicating an intent that the n-gram matches the selected social-graph element references from the selected structured query. At step 560, the social-networking system 160 may generate a second set of structured queries. Each structured query of the second set of structured queries may comprise a reference to the selected second node or selected edge. Thus, in response to the first user's selection, the social-networking system 160 may generate a new set of structured queries that takes into account the disambiguated n-gram. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

More information on structured search queries may be found in U.S. patent application Ser. No. 13/556,072, filed 23 Jul. 2012, and U.S. patent application Ser. No. 13/674,695, filed 12 Nov. 2012, each of which is incorporated by reference.

Generating Default Queries for a Page

Figure 6B:
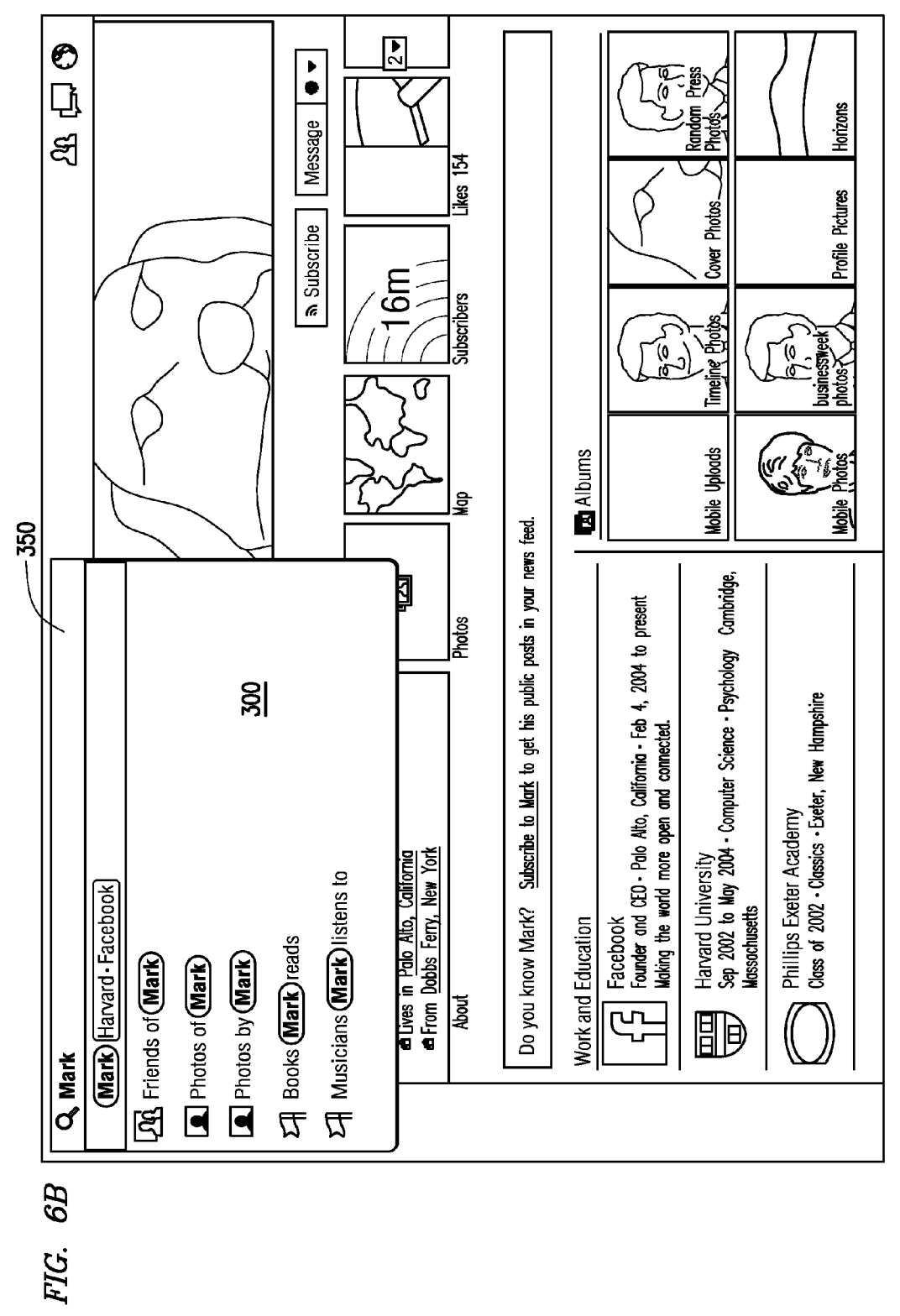
Figure 6C:
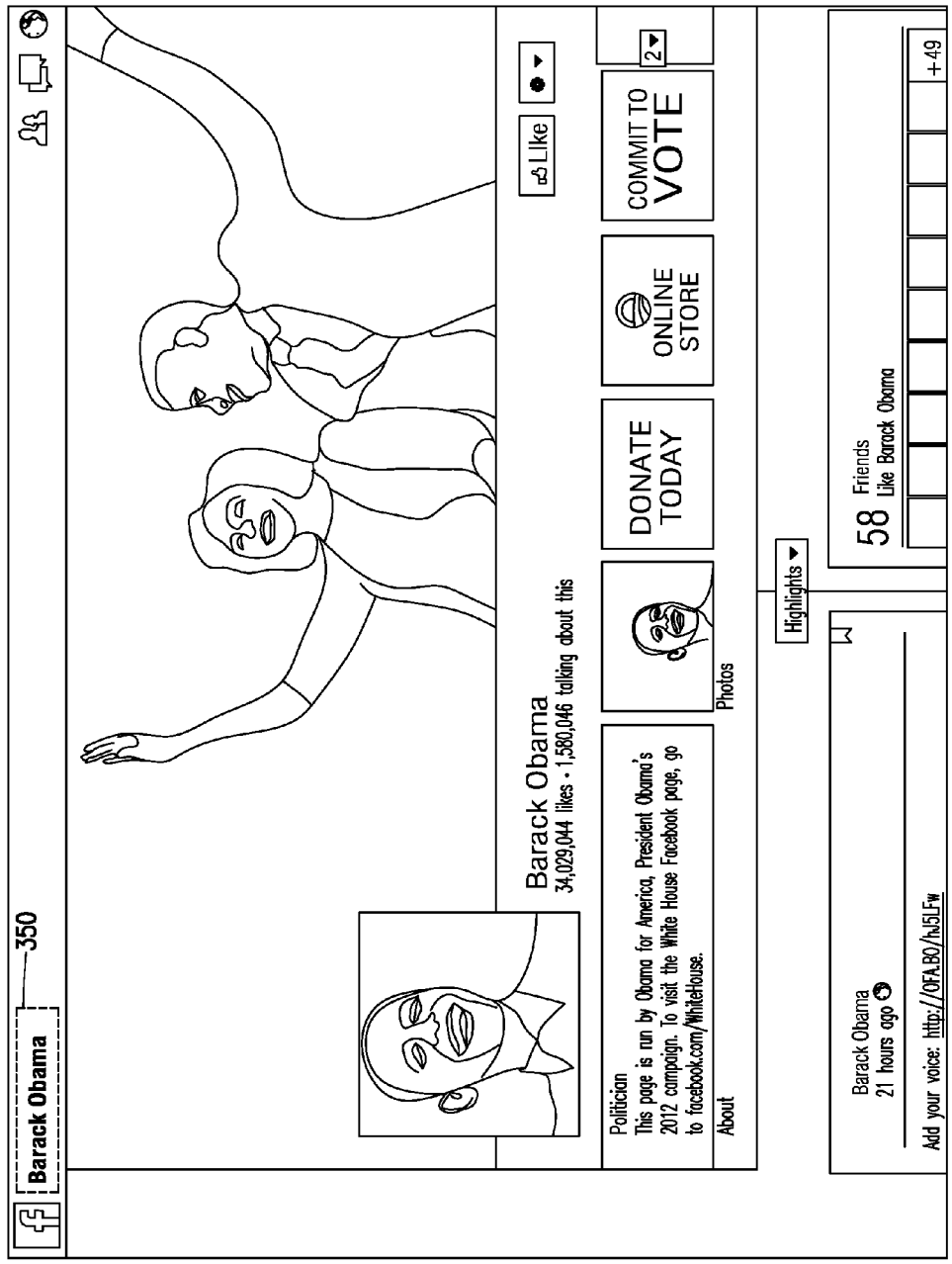

FIGS. 6A-6F illustrate example webpages of an online social network. In particular embodiments, the social-networking system 160 may generate a set of default structured queries for a page of the online social network. The social-networking system 160 may identify a page that a user is currently viewing or otherwise accessing and then identifying any social-graph elements corresponding to that page. The social-graph elements corresponding to a page may be, for example, the node corresponding to a user- or concept-profile page, or the nodes/edges referenced in a structured query used to generate a particular search-results page. The social-networking system 160 may then generate a set of default structured queries for the page based on the identified social-graph elements for that page. As an example and not by way of limitation, referencing FIG. 6B, when accessing a user-profile page for the user "Mark", which corresponds to the user node 202 for "Mark", some of the default structured queries for that page may include "Friends of Mark" or "Photos of Mark", as illustrated in drop-down menu 300, where each of these structured queries includes a reference to the user node 202 of the user "Mark". The generated default structured queries may then be transmitted to the user and displayed, for example, in a drop-down menu 300. In particular embodiments, the query field 350 may also serve as the title bar for the page. In other words, the title bar and query field 350 may effectively be a unified field on a particular page. The title bar for a page of the online social network may include a reference to the social-graph elements that correspond to that page. As an example and not by way of limitation, referencing is user-profile pages illustrated in FIGS. 6C-6D, the title bar across the top of the page includes the name of the concept corresponding to that page, "Barack Obama". As another example and not by way of limitation, referencing the search-results pages illustrated in FIGS. 6E-6F, the title bar across the top of the page includes the structured query used to generate the page, "Current Facebook employees". This title bar may also server as a query field 350 for the page. As such, a user accessing that page may then interact with the title of the page (e.g., by mousing over the title, clicking on it, or otherwise interacting with it), to input a query. In response to a user interacting with the title/query field, the social-networking system 160 may then generate a set of default structured queries for the page and automatically transmit and display these queries in a drop-down menu 300 on the page, as illustrated in FIG. 6B, where the drop-down menu 300 is displayed in association with the query field 350. Although this disclosure describes generating default queries for a page in a particular manner, this disclosure contemplates generating default queries for a page in any suitable manner.

In particular embodiments, the social-networking system 160 may identify a node of the social-graph 200 corresponding to a page currently accessed by a user. A user may access any suitable page, such as, for example, a user-profile page, a concept-profile page, a search-results page, a homepage, a newsfeed page, an email or messages page, or another suitable page of the online social network. Particular pages of the online social network may correspond to particular social-graph elements. In particular embodiments, the user may currently be accessing a profile page of the online social network corresponding to a particular user node 202 or concept node 204. Each user of the online social network may have a user-profile page that corresponds to a user node 202 of the user. As an example and not by way of limitation, referencing FIGS. 6A-6B, which illustrate a user-profile page for the user "Mark", this page may correspond to a user node 202 of the user "Mark". Similarly, each concept represented in the online social network may have a concept-profile page that corresponds to a concept node 204 representing that concept. As an example and not by way of limitation, referencing FIGS. 6C-6D, which illustrate a concept-profile page for the politician "Barack Obama", this page may correspond to a concept node 204 representing the politician "Barack Obama" (note, of course, that Barack Obama may also have a personal user-profile page). In particular embodiments, the user may currently be accessing a search-results page corresponding to a structured query. The structured query may comprise references to one or more nodes and one or more edges, and the search-results page may have been generated in response to this structured query. In this case, one or more of the nodes referenced in the structured query may be identified by the social-networking system 160 as being the nodes corresponding to the page. As an example and not by way of limitation, referencing FIGS. 6E-6F, which illustrate a search-results page generated by the structured query "Current Facebook employees" (which includes a reference to the concept node 204 for the company "Facebook"), the social-networking system 160 may identify the concept node 204 corresponding to the company "Facebook" as being the node corresponding to this search-results page. Although this disclosure describes identifying particular nodes corresponding to particular pages in a particular manner, this disclosure contemplates identifying any suitable nodes corresponding to any suitable pages in any suitable manner.

In particular embodiments, the social-networking system 160 may generate one or more structured queries that each comprise a reference to the identified node(s) of the page currently accessed by a user. These generated structured queries may be considered the default structured queries for the page. Each of these structured queries may also comprise references to one or more edges that are connected to the identified node. These default structured queries are effectively based on and reference the page currently being accessed by the user. Where the title bar and the query field 350 field are unified fields, as described previously, the social-networking system 160 may essentially use the title of the page (which itself may be considered a reference to one or more social-graph elements) as a template query upon which query modifications are added to generate the default structured queries. As an example and not by way of limitation, referencing FIG. 6D, the title of the page is "Barack Obama", where this title is unified with the query field 350, such that a user may interact with the title to immediately bring up a drop-down menu 300 with a set of default queries for the page that reference the page the user is interacting with (i.e., the suggested default queries contain references to the concept-node 204 associated with the concept "Barack Obama"). In particular embodiments, if the user is accessing a search-results page, then the default structured queries generated by the social-networking system 160 may comprises references to the social-graph elements referenced in the structured query used to generate that search-results page. In other words, if a structured query comprising references to one or more nodes and one or more edges is used to generate a particular search-results page, then the default structured queries generated for that page will also include at least references to the one or more nodes and one or more edges of the original structured query. Thus, the structured query used to generate a particular search-results page may be used as the base upon which expansions of that initial query may be suggested as default queries. As an example and not by way of limitation, referencing FIG. 6F, the title of the page is "Current Facebook employees", where this title is also a structured query that was used to generate the search-results page and has now been populated into query field 350. When the user interacts with the query field, the social-networking system 160 may generate a set of default structured queries based on the original structure query, where each of the default structured queries is effectively a modification of the original query "Current Facebook employees". For example, in the example illustrated in FIG. 6F, the social-networking system 160 has generated the suggested default structured queries "Current Facebook employees who live in Austin, Tex." (which references the additional social-graph elements of a live-in-type edge 206 and a concept node 204 for "Austin, Tex.") and "Current Facebook employees who like Old Pro" (which references the additional social-graph elements of a like-type edge 206 and a concept node 204 for "Old Pro), where each of these references the social-graph elements from the original structured query as well as additional social-graph elements that are modifications of the original query. Although this disclosure describes generating particular default structured queries in a particular manner, this disclosure contemplates any suitable default structured queries in any suitable manner. Moreover, although this disclosure describes generating default structured queries for particular types of pages, this disclosure contemplates generating default structured queries for any suitable types of pages.

Figure 6D:
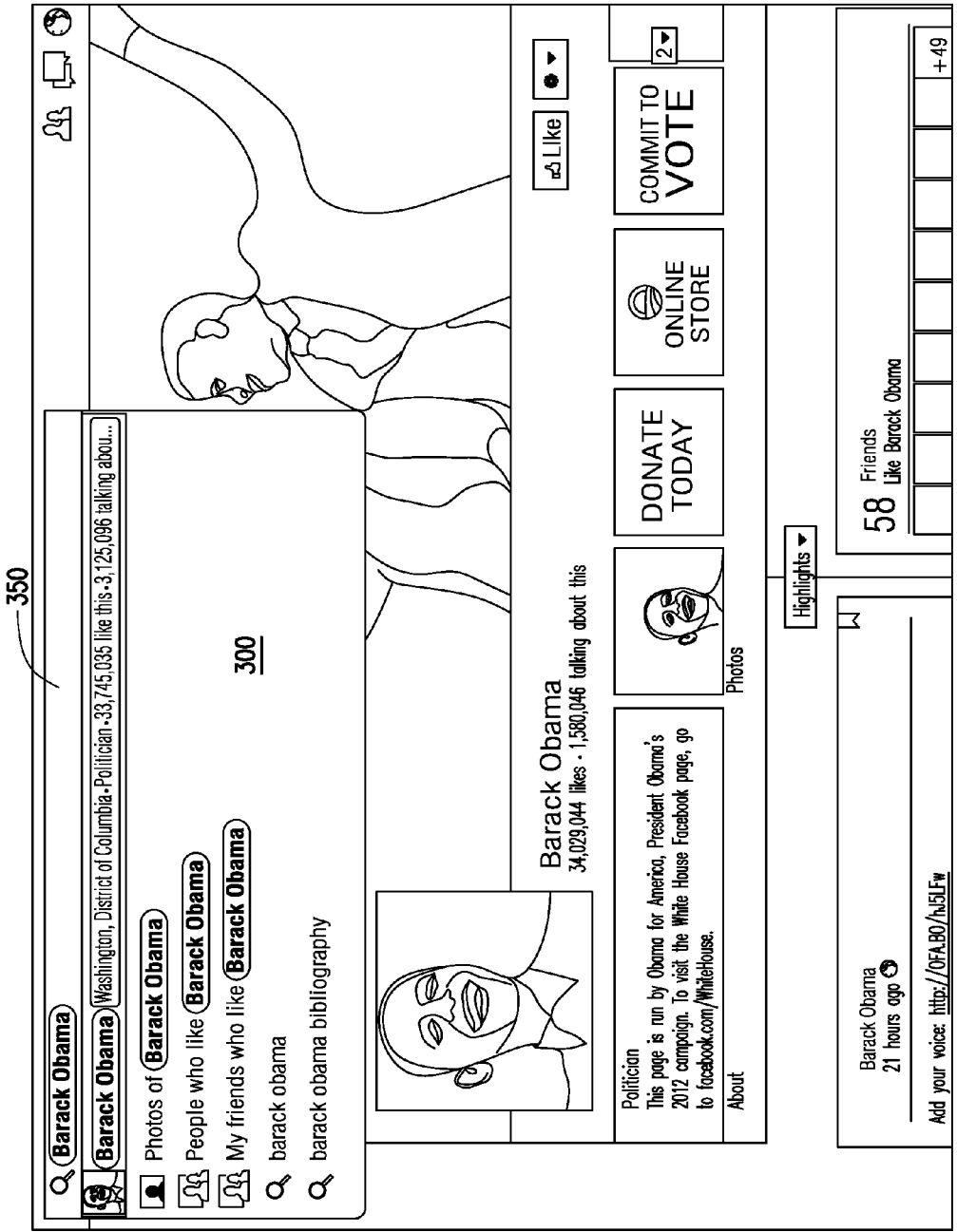
Figure 6F:
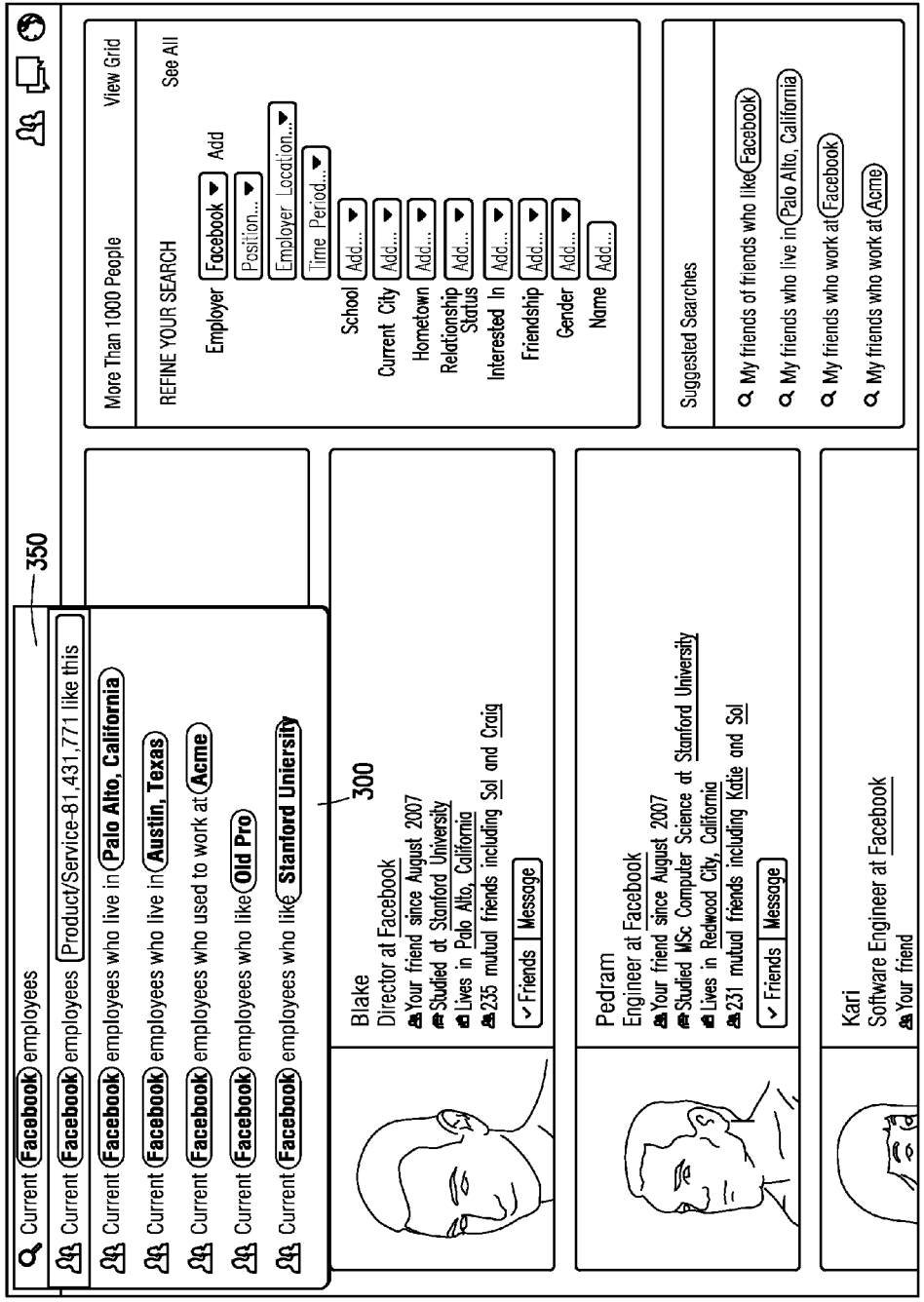

In particular embodiments, the social-networking system 160 may transmit one or more of the default structured queries to the querying user for display on the page currently accessed by the user. These structured queries may be transmitted and displayed as previously described. As an example and not by way of limitation, the web browser 132 on the querying user's client system 130 may display the transmitted structured queries in a drop-down menu 300 in association with a query field 350 of a webpage, as illustrated in FIGS. 6B, 6D, and 6F. The default structured queries generated for a particular page may not be displayed until the user interacts with the query field 350, such as, for example, by mousing over or clicking on the query field 350, which may cause the structured queries to be transmitted and displayed in drop-down menu 300. The structured queries displayed in drop-down menu 300 may enable the user accessing the page to selected one of the structured queries, indicating that the selected structured query should be executed by the social-networking system 160. Although this disclosure describes transmitting particular default structured queries in a particular manner, this disclosure contemplates transmitting any suitable default structured queries in any suitable manner.

In particular embodiments, the social-networking system 160 may generate one or more default structured queries in response to a user accessing a page that does not correspond to a particular social-graph element. A user may access a page of the online social network that does not necessarily correspond to any particular social-graph element (such as, for example, a newsfeed page, which may not necessarily correspond to any particular nodes or edges of the social graph 200). In this case, the page may be considered to be in a "null state" with respect to identifying social-graph elements that correspond to the page. Similarly, for a page that does correspond to one or more social-graph elements, the user accessing that page may place the query field 350 of the page into a null state by, for example, clearing or deleting any title or query that that had previously occupied the field. For a null-state page (or a query field 350 in a null state), the social-networking system 160 may generate a set of default structured queries for the page based on a variety of factors, such as, for example, the type of page the user is accessing, the query history of the user, the general or current popularity of particular queries, the usefulness of particular queries, other suitable factors, or any combination thereof. These default structured queries may be pre-generated and accessed from a cache or generated dynamically in response to input from the user. In particular embodiments, when the user is accessing a page that does not correspond to a particular social-graph element, the social-networking system 160 may access a set of default structured queries corresponding to the page. Each of these default structured queries may comprise references to one or more edges 206 (or edge-types) or one or more nodes (or node-types). As an example and not by way of limitation, FIG. 3 illustrates a newsfeed page being accessed by a user of the online social network. Some of the default structured queries for this page may include "Friends of . . ." or "People who like . . . ", as illustrated in drop-down menu 300, where these structured queries included references to friend-type edges 206 and like-type edges 206, respectively. In the example illustrated in FIG. 3, the default structured queries contain ellipses to indicate that the user may input text into the query field 350 to complete the query. As another example and not by way of limitation, for the same newsfeed page illustrated in FIG. 3, the social-networking system 160 may generate default structured queries that include "My friends", "Photos of my friends", "Photos I like", or "Apps my friends use", where these structured queries include reference to both edges and nodes (e.g., for the structured query "My friends", the term "My" is a reference to the user node 202 of the querying user and the term "friends" is a reference to friend-type edges 206 connected to that node). Although this disclosure describes generating default structured queries for a page that does not correspond to particular social-graph elements in a particular manner, this disclosure contemplates generating default structured queries for a page that does not correspond to particular social-graph elements in any suitable manner.

Figure 7:
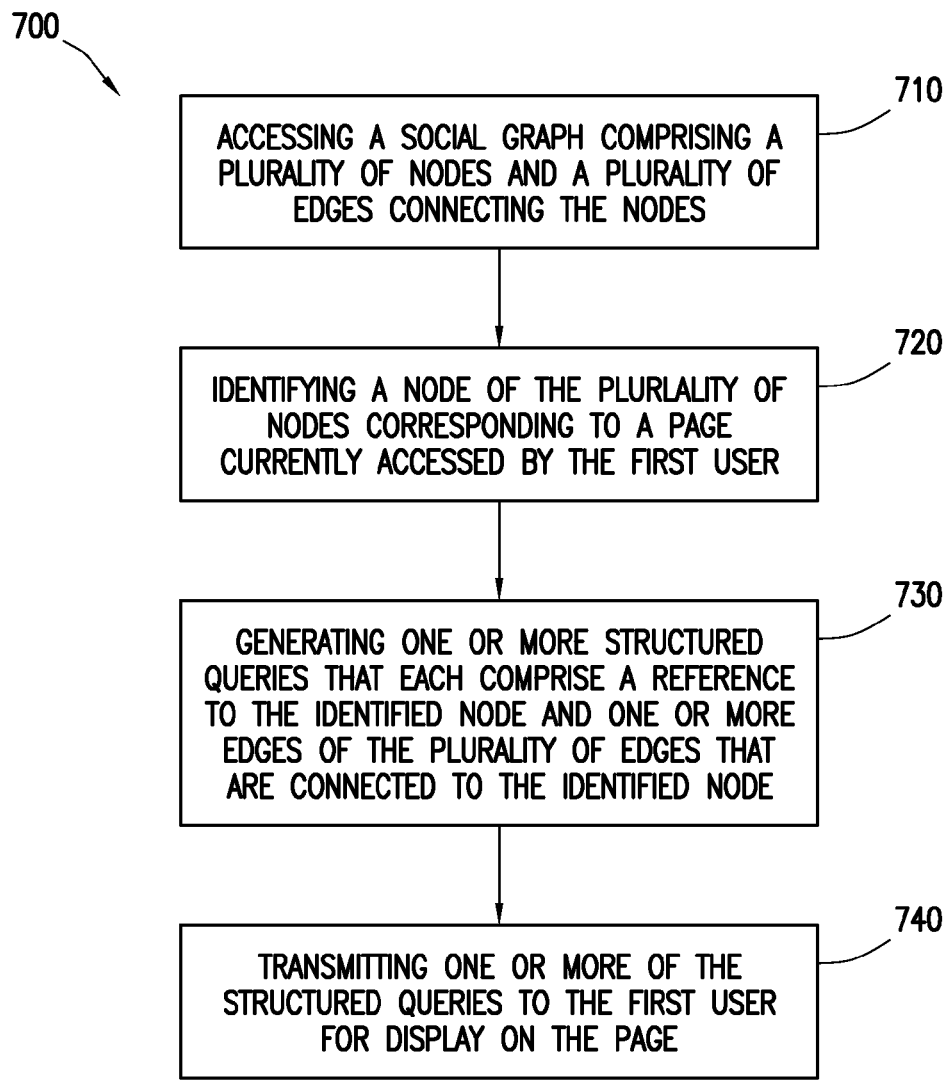
FIG. 7 illustrates an example method for generating default structured search queries for a page.

FIG. 7 illustrates an example method 700 for generating default structured search queries for a page. The method may begin at step 710, where the social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 720, the social-networking system 160 may identify a node of the plurality of nodes corresponding to a page currently accessed by the first user. The page may be, for example, a user-profile page, a concept-profile page, a search-results page, or another suitable page of the online social network. At step 730, the social-networking system 160 may generate one or more structured queries. Each of these structured queries may reference the identified node corresponding to the page currently accessed by the first user. The structured queries may also reference one or more edges of the plurality of edges that are connected to the identified node. At step 740, the social-networking system 160 may transmit one or more of the structured queries to the first user for display on the page. These may be considered the default structured queries for the page, which have been determined based on the social-graph elements associated with the page. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Generating Search Results

In particular embodiments, in response to a structured query received from a querying user, the social-networking system 160 may generate one or more search results, where each search result matches (or substantially matches) the terms of the structured query. The social-networking system 160 may receive a structured query from a querying user (also referred to as the "first user", corresponding to a first user node 202). In response to the structured query, the social-networking system 160 may generate one or more search results corresponding to the structured query. Each search result may include link to a profile page and a description or summary of the profile page (or the node corresponding to that page). The search results may be presented and transmitted to the querying user as a search-results page. FIG. 6E illustrates an example search-results page generated in response to a particular structured query. The structured query used to generate a particular search-results page is shown in query field 350, and the various search results generated in response to the structured query are illustrated in a field for presented search results. In particular embodiments, the query field 350 may also serve as the title bar for the page. In other words, the title bar and query field 350 may effectively be a unified field on the search-results page. As an example, FIG. 6E illustrates a search-results page with the structured query "Current Facebook employees" in query field 350. This structured query also effectively serves as the title for the generated page, where the page shows a plurality search results of users of the online social network who are employees at the company "Facebook". The search-results page may also include a field for modifying search results and a field for providing suggested searches. When generating the search results, the social-networking system 160 may generate one or more snippets for each search result, where the snippets are contextual information about the target of the search result (i.e., contextual information about the social-graph entity, profile page, or other content corresponding to the particular search result). Although this disclosure describes and illustrates particular search-results pages, this disclosure contemplates any suitable search-results pages.

More information on generating search results may be found in U.S. patent application Ser. No. 13/731,939, filed 31 Dec. 2012, which is incorporated by reference.

Systems and Methods

Figure 8:
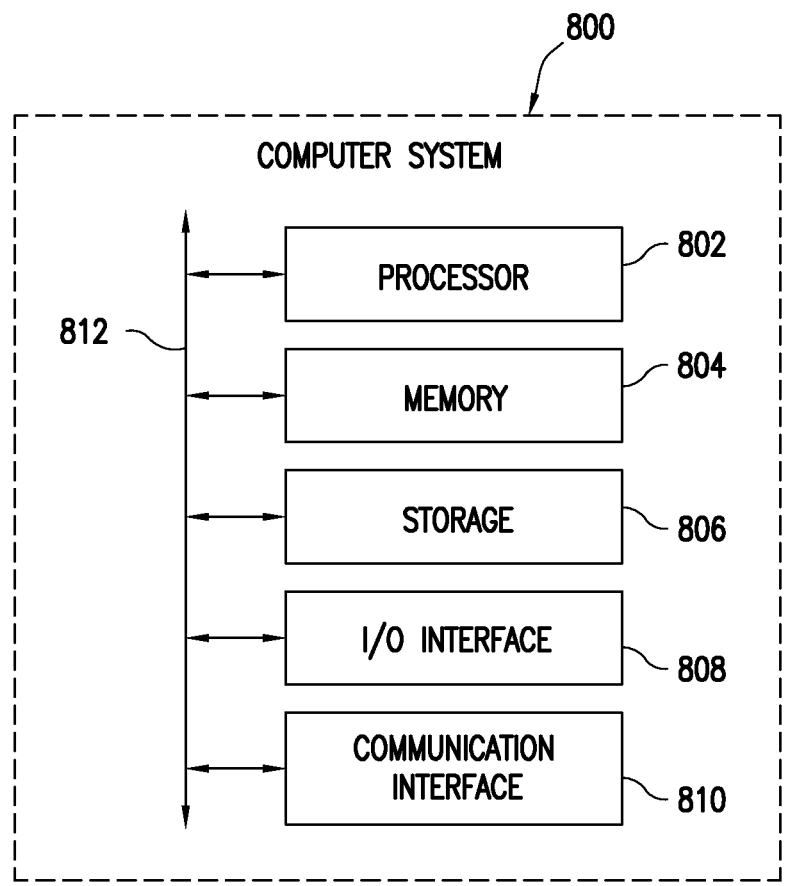
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing device:
    accessing a social graph comprising a plurality of nodes and a plurality of edges connecting the nodes, each of the edges between two of the nodes representing a single degree of separation between them, the nodes comprising:
        a first node corresponding to a first user associated with an online social network; and
        a plurality of second nodes that each correspond to a concept or a second user associated with the online social network;
    receiving from the first user an unstructured text query comprising an ambiguous n-gram;
    identifying a plurality of second nodes or a plurality of edges corresponding to the ambiguous n-gram;
    generating a first set of structured queries, each structured query from the first set of structured queries corresponding to an identified second node or identified edge, the structured query comprising a reference to the identified second node or identified edge;
    receiving from the first user a selection of a first structured query from the first set of structured queries, the first structured query corresponding to a selected second node or selected edge from the identified second nodes or identified edges, respectively; and
    generating a second set of structured queries, each structured query of the second set of structured queries comprising a reference to the selected second node or selected edge.

2. The method of claim 1, wherein receiving from the first user the unstructured text query comprises receiving one or more characters of a character string as the first user at a client system enters the character string into a graphical user interface.

3. The method of claim 2, wherein the graphical user interface comprises a query field, and wherein the character string is entered by the first user into the query field.

4. The method of claim 1, wherein for each structured query from the first set of structured queries, the reference to the identified second node or identified edge is highlighted to indicate the reference corresponds to the ambiguous n-gram.

5. The method of claim 1, wherein for each structured query from the first set of structured queries, the structured query further comprises a snippet comprising contextual information about the identified second node or identified edge corresponding to the structured query.

6. The method of claim 1, further comprising transmitting the first set of structured queries to the first user, wherein each structured query of the first set of structured queries is selectable by the first user to indicate that the identified second node or identified edge referenced in the structured query matches an intent of the user for the ambiguous n-gram.

7. The method of claim 1, further comprising transmitting the first set of structured queries for presentation to the first user as the first user enters the unstructured text query into a graphical user interface, the presentation of the first set of structured queries to the first user enabling the first user to select the first structured query from the first set of structured queries.

8. The method of claim 1, further comprising receiving from the first user a selection of a second structured query from the second set of structured queries.

9. The method of claim 8, further comprising generating one or more search results corresponding to the second structured query.

10. The method of claim 9, wherein the second structured query further comprises reference to zero or more additional second nodes of the plurality of second nodes and zero or more additional edges of the plurality of edges, and wherein each search result corresponds to a second node of the plurality of second nodes that is connect to either the selected second node or one of the additional second nodes by one or more of either the selected edge or one of the additional edges.

11. The method of claim 1, wherein the unstructured text query is received as a portion of a third structured query, wherein the third structured query comprises:
    references to one or more second nodes or second edges; and
    the unstructured text query.

12. The method of claim 1, wherein the ambiguous n-gram comprises one or more characters of text entered by the first user.

13. The method of claim 1, wherein the ambiguous n-gram comprises a contiguous sequence of n items from the unstructured text query.

14. The method of claim 1, wherein one or more of the structured queries of the second set of structured queries further comprises references to one or more second nodes of the plurality of second nodes and one or more edges of the plurality of edges.

15. The method of claim 1, wherein identifying the plurality of second nodes or the plurality of edges corresponding to the ambiguous n-gram comprises:
    determining a score for each n-gram that the n-gram corresponds to a second node of the plurality of second nodes or an edge of the plurality of edges; and
    identifying each second nodes or each edge having a score greater than a threshold score, wherein at least two second nodes or two edges have a score greater than the threshold score.

16. The method of claim 15, wherein the score for each n-gram is a probability that the n-gram correspond to a second node of the plurality of second nodes or an edge of the plurality of edges.

17. The method of claim 15, wherein determining the score that an n-gram corresponds to a second node of the plurality of second nodes is based on the degree of separation between the first node and the second node.

18. The method of claim 15, wherein determining the score for each n-gram is based on a search history associated with the first user.

19. One or more computer-readable non-transitory storage media embodying software that is operable when executed to:
    access a social graph comprising a plurality of nodes and a plurality of edges connecting the nodes, each of the edges between two of the nodes representing a single degree of separation between them, the nodes comprising:
        a first node corresponding to a first user associated with an online social network; and
        a plurality of second nodes that each correspond to a concept or a second user associated with the online social network;
    receive from the first user an unstructured text query comprising an ambiguous n-gram;
    identify a plurality of second nodes or a plurality of edges corresponding to the ambiguous n-gram;
    generate a first set of structured queries, each structured query from the first set of structured queries corresponding to an identified second node or identified edge, the structured query comprising a reference to the identified second node or identified edge;

receive from the first user a selection of a first structured query from the first set of structured queries, the first structured query corresponding to a selected second node or selected edge from the identified second nodes or identified edges, respectively; and generate a second set of structured queries, each structured query of the second set of structured queries comprising a reference to the selected second node or selected edge.

20. A system comprising: one or more processors; and a memory coupled to the processors comprising instructions executable by the processors, the processors operable when executing the instructions to:

access a social graph comprising a plurality of nodes and a plurality of edges connecting the nodes, each of the edges between two of the nodes representing a single degree of separation between them, the nodes comprising:

a first node corresponding to a first user associated with an online social network; and a plurality of second nodes that each correspond to a concept or a second user associated with the online social network;

receive from the first user an unstructured text query comprising an ambiguous n-gram;

identify a plurality of second nodes or a plurality of edges corresponding to the ambiguous n-gram;

generate a first set of structured queries, each structured query from the first set of structured queries corresponding to an identified second node or identified edge, the structured query comprising a reference to the identified second node or identified edge;

receive from the first user a selection of a first structured query from the first set of structured queries, the first structured query corresponding to a selected second node or selected edge from the identified second nodes or identified edges, respectively; and generate a second set of structured queries, each structured query of the second set of structured queries comprising a reference to the selected second node or selected edge.

* * * * *